(12) United States Patent
Wiley

(10) Patent No.: US 10,027,504 B2  
(45) Date of Patent: Jul. 17, 2018

(54) PROTOCOL-ASSISTED ADVANCED LOW-POWER MODE

(71) Applicant: QUALCOMM Incorporated, San Diego, CA (US)

(72) Inventor: George Alan Wiley, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 56 days.

(21) Appl. No.: 15/299,260

(22) Filed: Oct. 20, 2016

(65) Prior Publication Data

US 2017/0118039 A1   Apr. 27, 2017

Related U.S. Application Data

(60) Provisional application No. 62/305,355, filed on Mar. 8, 2016, provisional application No. 62/245,569, filed on Oct. 23, 2015.

(51) Int. Cl.
*H04L 12/40* (2006.01)
*G06F 13/42* (2006.01)

(52) U.S. Cl.
CPC ........ *H04L 12/40136* (2013.01); *G06F 13/42* (2013.01); *H04L 12/40032* (2013.01); *H04L 12/40039* (2013.01); *Y02D 50/20* (2018.01)

(58) Field of Classification Search
CPC .............. G06F 13/42; H04L 12/40032; H04L 12/40039; H04L 12/40136; Y02B 60/32
See application file for complete search history.

(56) References Cited

U.S. PATENT DOCUMENTS

| 9,059,779 B2 | 6/2015 | Li et al. |
| 9,094,246 B1 | 7/2015 | Chi et al. |
| 9,148,198 B1 | 9/2015 | Zhang et al. |

(Continued)

FOREIGN PATENT DOCUMENTS

WO   WO-03023587 A2   3/2003

OTHER PUBLICATIONS

International Search Report and Written Opinion—PCT/US2016/058291—ISA/EPO—dated Jan. 3, 2017.

(Continued)

*Primary Examiner* — Kashif Siddiqui  
(74) *Attorney, Agent, or Firm* — Loza & Loza LLP

(57) ABSTRACT

System, methods and apparatus are described that support multimode operation of a data communication interface. A method includes receiving a first code word transmitted while a physical interface of the device is configured to operate in a low-power mode of operation, reconfiguring the physical interface in response to the first code word such that it operates in a high-speed mode, transmitting data while the physical interface operates in the high-speed mode of operation, receiving a second code word transmitted while the physical interface operated in the high-speed mode of operation, and reconfiguring the physical interface in response to the second code word, such that it operates in the low-power mode of operation. The first code word, the second code word, and the data may be transmitted in signals bound by a common voltage range. In one example, the voltage range is less than 600 millivolts.

30 Claims, 32 Drawing Sheets

(56) References Cited

U.S. PATENT DOCUMENTS

| | | | |
|---|---|---|---|
| 2003/0033417 A1* | 2/2003 | Zou | G06F 3/023 709/230 |
| 2005/0117601 A1 | 6/2005 | Anderson et al. | |
| 2015/0098537 A1 | 4/2015 | Sengoku | |
| 2016/0013926 A1 | 1/2016 | Kil | |
| 2017/0116150 A1* | 4/2017 | Wiley | G06F 13/4282 |

OTHER PUBLICATIONS

MDDI Standard., "VESA Mobile Display Digital Interface Standard-Version 1", 860 Hillview Court, Suite 150, Milpitas, CA 95035, Copyright 2002-2004 Video Electronics Standards Association, Jul. 23, 2004, XP055237537, pp. 1-172. Retrieved from the Internet: URL: http://ftp.cis.nctu.edu.tw/csie/Software/X11/privateNeSaSpEcS/VESA_Document_Center_Video_Interface/MDDiv1.pdf.

"MIPI Alliance Specification for D-PHY," Sep. 22, 2009 (Sep. 22, 2009), pp. 1-125, XP055057664 [Retrieved on Mar. 25, 2013].

* cited by examiner

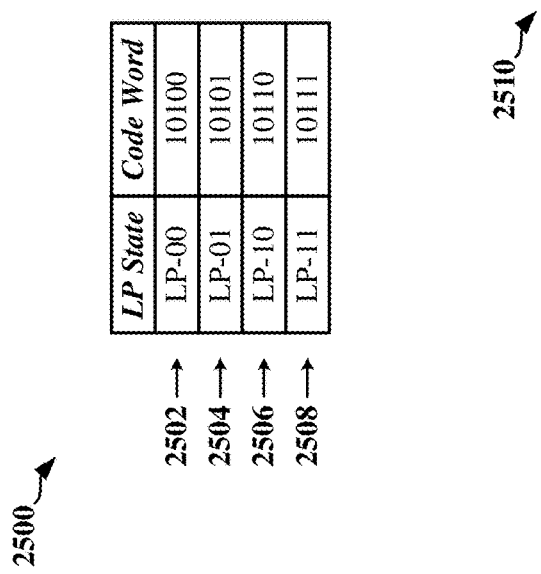
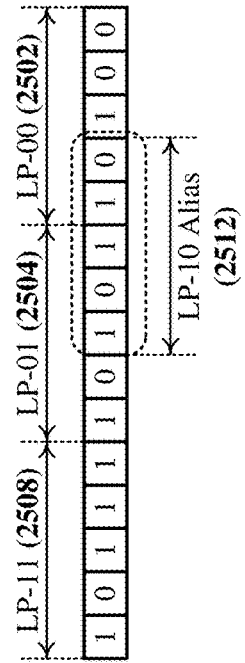
FIG. 25

| State | Exit State |
|---|---|
| ALP-Pause Stop (Link State $V_A=V_B=V_C$) | |
| HS Cal. Preamble | HS Cal. Sync Identifier |
| HS Cal. Alt. Seq. Identifier | HS Cal. Alt. Seq. Identifier |
| HS Cal. Alternate Sequence | HS Cal. UID Seq. Identifier |
| HS Cal. UID Seq. Identifier | HS Cal. Alternate Sequence |
| HS Cal. User-Defined Seq. | HS Sync Word |
| HS Burst Preamble from Stop | ALP ULPS Code |
| | ALP Codes (not Stop or ULPS) |
| HS Sync Word | HS Sync Word |
| HS Data | HS Data |
| Post1 | Post1 |
| ALP Stop Code | ALP Stop Code |
| Post2 to Stop | Post2 to Stop |
| ALP Codes (not Stop or ULPS) | ALP-Pause Stop |
| | ALP Codes (not Stop or ULPS) |
| ALP ULPS Code | ALP ULPS Code |
| Post2 to ULPS | Post2 to ULPS |
| ALP-Pause ULPS | ALP-Pause ULPS |
| HS Burst Preamble from ULPS | HS Burst Preamble |
| | ALP Stop Code |

ALP TX State Transition Description

2902

| ALP Code | Symbol Sequence | Corresponding LLP Sequence |
|---|---|---|
| Stop Code | 0244440 | LP-111 (End of Transmission, or EoT) |
| ULPS Code | 0244441 | Escape Mode Entry + Ultra-Low Power State (ULPS) |
| Trig 1 Code | 0244442 | Escape Mode Entry + Undefined-1 Trigger |
| Trig 2 Code | 1244443 | Escape Mode Entry + Undefined-2 Trigger |
| Reset Trig Code | 1244444 | Escape Mode Entry + Reset-Trigger (Bounce Application) |
| Trig 3 Code | 1244445 | Escape Mode Entry + Undefined-3 Trigger |
| Trig 4 Code | 2244446 | Escape Mode Entry + Undefined-4 Trigger |
| Trig 5 Code | 2244447 | Escape Mode Entry + Undefined-5 Trigger |
| Spacer Code | 2244448 | n/a |
| LPDT Start Code | 0244449 | Escape Mode Entry + LP Data Transfer Command |
| LPDT Symbol Code | S,0444446 | LP Data 4 bits of data |
| Post2 | 4444444 | n/a |

Link Turnaround Sequence

PROTOCOL-ASSISTED ADVANCED LOW-POWER MODE

CROSS-REFERENCE TO RELATED APPLICATIONS

This application claims the benefit of U.S. Provisional Application Ser. No. 62/245,569 filed in the U.S. Patent Office on Oct. 23, 2015, and U.S. Provisional Application Ser. No. 62/305,355 filed in the U.S. Patent Office on Mar. 8, 2016, the entire content of these applications being incorporated herein by reference and for all applicable purposes

BACKGROUND

Field

At least one aspect generally relates to data communications interfaces, and more particularly, to data communications interfaces configurable for communicating in multiple modes and/or speeds between integrated circuit devices.

Background

Manufacturers of mobile devices, such as cellular phones, may obtain components of the mobile devices from various sources, including different manufacturers. For example, the application processor in a cellular phone may be obtained from a first manufacturer, while the display for the cellular phone may be obtained from a second manufacturer. Moreover, multiple standards are defined for interconnecting certain components of the mobile devices. For example, there are multiple types of interface defined for communications between an application processor and display and camera components of a mobile device. Some components employ an interface that conforms to one or more standards specified by the Mobile Industry Processor Interface (MIPI) Alliance. For example, the MIPI Alliance defines protocols for a camera serial interface (CSI) and a display serial interface (DSI).

MIPI CSI-2 and MIPI DSI or DSI-2 standards define a wired interface between a camera and application processor, or between an application processor and display. The low-level physical-layer (PHY) interface in each of these applications can be MIPI C-PHY or MIPI D-PHY. High-speed modes and low-power modes of communication are defined for MIPI C-PHY and MIPI D-PHY. The MIPI C-PHY high-speed mode uses a low-voltage multiphase signal transmitted in different phases on a 3-wire link. The MIPI D-PHY high-speed mode uses a plurality of 2-wire lanes to carry low-voltage differential signals. The low-power mode of MIPI C-PHY and MIPI D-PHY provides lower rates than the high-speed mode and transmits signals at higher voltages where the high-speed signals are undetectable by receivers configured for low-power operation.

As device technology improves, higher data rates and lower-power consumption may be obtained when devices are operated at lower voltage levels. There is a need to improve MIPI C-PHY and MIPI D-PHY interfaces to take advantage of technology improvements.

SUMMARY

Embodiments disclosed herein provide systems, methods and apparatus that enable an application processor to communicate with a display using any of a plurality of interface standards bidirectionally, and in a low-power mode. According to certain aspects described herein, two or more Integrated Circuit (IC) devices may be collocated in an electronic apparatus and communicatively coupled through one or more data links that can be configured with one of a plurality of interface standards.

In an aspect of the disclosure, a method performed in a device configured for multiple modes of data communication includes receiving a first code word transmitted while a physical interface of the device is configured to operate in a low-power mode of operation, responsive to the first code word, reconfiguring the physical interface of the device to operate in a high-speed mode of operation, transmitting data while the physical interface of the device is configured to operate in the high-speed mode of operation, receiving a second code word transmitted while the physical interface of the device is configured to operate in the high-speed mode of operation, and responsive to the second code word, reconfiguring the physical interface of the device to operate in the low-power mode of operation. The first code word, the second code word, and the data may be transmitted in signals bound by a common voltage range. In one example, the voltage range is less than 600 millivolts.

In an aspect of the disclosure, an apparatus includes a physical interface configurable for multiple communication modes, and a processor. The processor may be configured to receive a first code word transmitted while the physical interface is configured to operate in a low-power mode of operation, responsive to the first code word, reconfigure the physical interface to operate in a high-speed mode of operation, transmit data while the physical interface is configured to operate in the high-speed mode of operation, receive a second code word transmitted while the physical interface is configured to operate in the high-speed mode of operation, and responsive to the second code word, reconfigure the physical interface to operate in the low-power mode of operation. The first code word, the second code word, and the data may be transmitted in signals bound by a common voltage range. In one example, the voltage range is less than 600 millivolts.

In an aspect of the disclosure, a processor readable storage medium includes code for receiving a first code word transmitted while a physical interface is configured to operate in a low-power mode of operation, responsive to the first code word, reconfiguring the physical interface to operate in a high-speed mode of operation, transmitting data while the physical interface is configured to operate in the high-speed mode of operation, receiving a second code word transmitted while the physical interface is configured to operate in the high-speed mode of operation, and responsive to the second code word, reconfiguring the physical interface to operate in the low-power mode of operation. The first code word, the second code word, and the data may be transmitted in signals bound by a common voltage range. In one example, the voltage range is less than 600 millivolts.

In an aspect of the disclosure, and apparatus includes means for receiving code words from a multi-wire communication link, the means for receiving code words including a physical interface, where the code words are configured to initiate a change in communication mode of the physical interface. The apparatus may include means for reconfiguring the physical interface to operate in a high-speed mode of operation in response to one of the code words and for reconfiguring the physical interface to operate in a low-power mode of operation in response to another of the code words, and means for transmitting data while the physical interface is configured to operate in the high-speed mode of operation. The first code word, the second code word, and the data may be transmitted in signals bound by a common voltage range. In one example, the voltage range is less than 600 millivolts.

BRIEF DESCRIPTION OF THE DRAWINGS

FIG. 25 illustrates the potential formation or appearance of an alias code word in a D-PHY interface.

FIG. 29 provides tables advanced low-power modes of operation in accordance with certain aspects disclosed herein.

DETAILED DESCRIPTION

Figure 1:
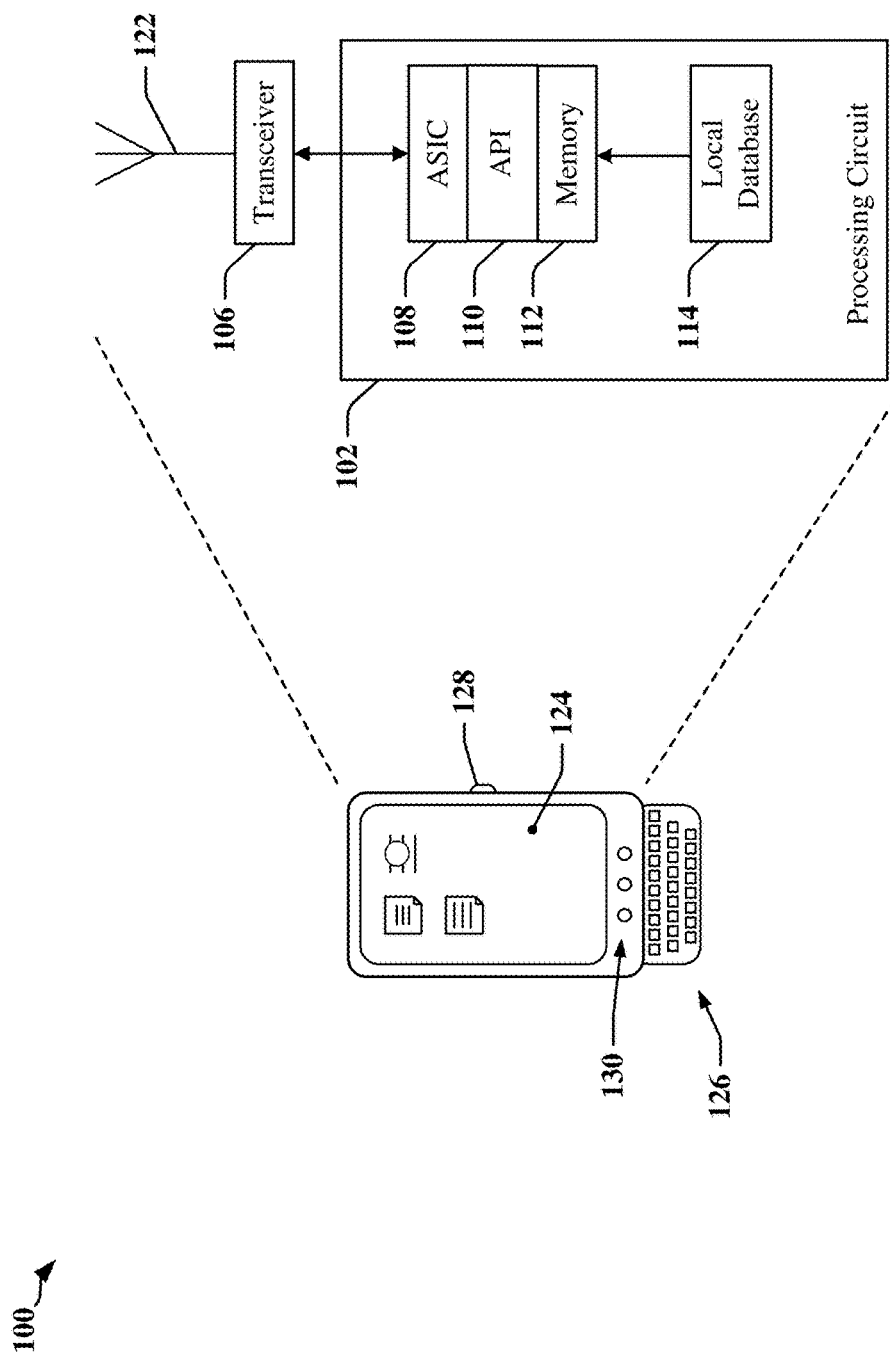
FIG. 1 depicts an apparatus employing a data link between integrated circuit (IC) devices that selectively operates according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of data communication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include read-only memory (ROM) or random-access memory (RAM), electrically erasable programmable ROM (EEPROM), including ROM implemented using a compact disc (CD) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 depicts an apparatus 100 that may employ a communication link between IC devices. In one example, the apparatus 100 may include a communication device that communicates through a radio frequency (RF) communications transceiver 106 with a radio access network (RAN), a core access network, the Internet and/or another network. The communications transceiver 106 may be operably coupled to a processing circuit 102. The processing circuit 102 may include one or more IC devices, such as an application-specific IC (ASIC) 108. The ASIC 108 may include one or more processing devices, logic circuits, and so on. The processing circuit 102 may include and/or be coupled to processor readable storage such as a memory device 112 that can store and maintain data and instructions for execution or other use by the processing circuit 102. The processing circuit 102 may be controlled by one or more of an operating system and an application programming interface (API) 110 layer that supports and enables execution of software modules residing in storage media, such as the memory device 112 of the device. The memory device 112 may include ROM or RAM, EEPROM, flash cards, or any memory device that can be used in processing systems and computing platforms. The processing circuit 102 may include or access a local database 114 that can maintain operational parameters and other information used to configure and operate the apparatus 100. The local database 114 may be implemented using one or more of a database module, flash memory, magnetic media, EEPROM, optical media, tape, soft or hard disk, or the like. The processing circuit may also be operably coupled to external devices such as an antenna 122, a display 124, operator controls, such as a button 128 and a keypad 126 among other components.

Figure 2:
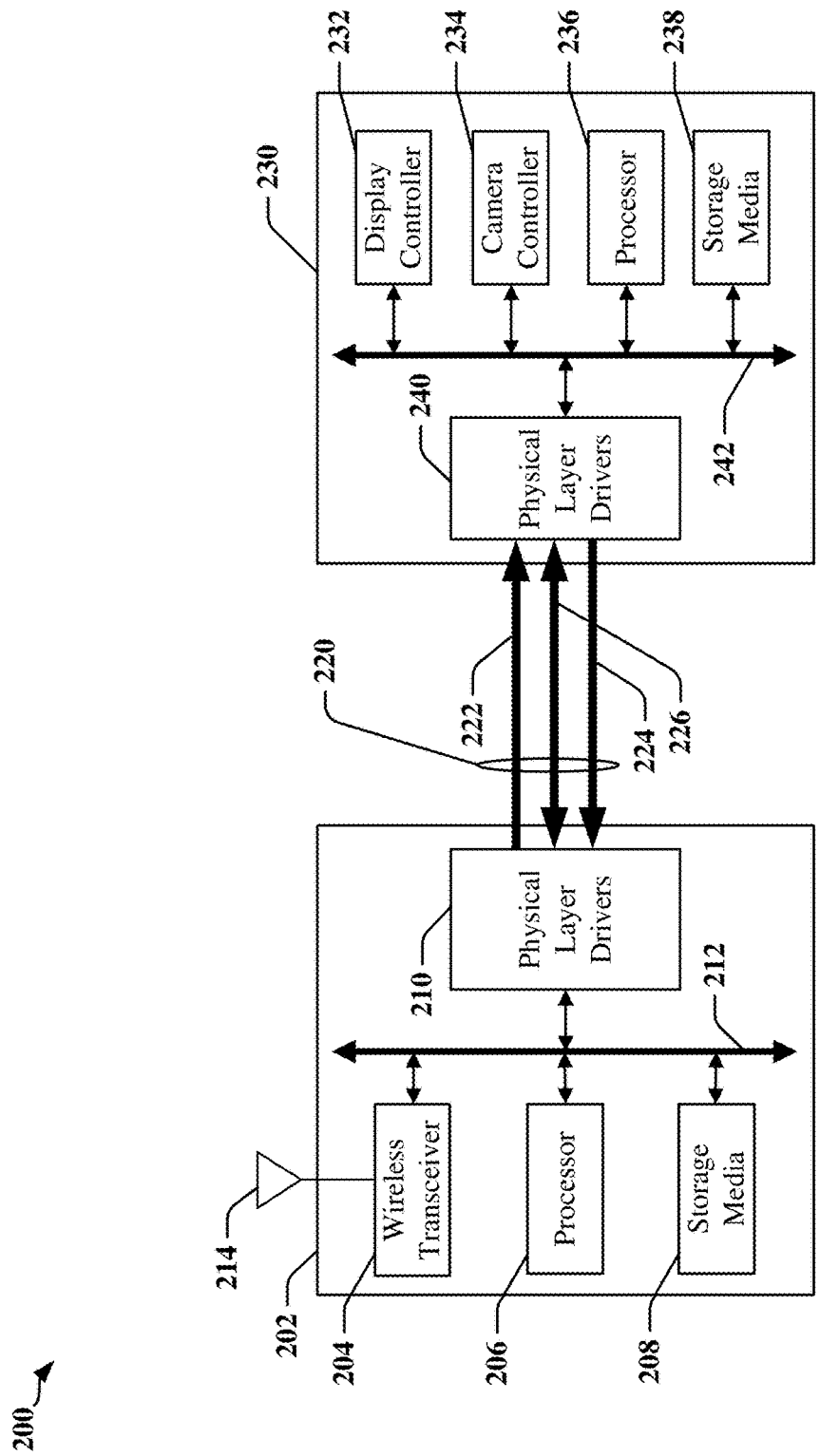
FIG. 2 illustrates a system architecture for an apparatus employing a data link between IC devices.

FIG. 2 is a block schematic diagram illustrating certain aspects of an apparatus 200 such as a mobile apparatus that employs a communication link 220 to connect various subcomponents. In one example, the apparatus 200 includes a plurality of IC devices 202 and 230 that exchange data and control information through the communication link 220. The communication link 220 may be used to connect IC devices 202 and 230 that are located in close proximity to one another, or physically located in different parts of the apparatus 200. In one example, the communication link 220 may be provided on a chip carrier, substrate or circuit board that carries the IC devices 202 and 230. In another example, a first IC device 202 may be located in a keypad section of a mobile computing device while a second IC device 230 may be located in a display section of mobile computing device. In another example, a portion of the communication link 220 may include a cable or optical connection.

The communication link 220 may provide multiple channels 222, 224 and 226. One or more channels 226 may be bidirectional, and may operate in half-duplex and/or full-duplex modes. One or more channels 222 and 224 may be unidirectional. The communication link 220 may be asymmetrical, providing higher bandwidth in one direction. In one example described herein, a first channel may be referred to as a forward channel 222 while a second channel may be referred to as a reverse channel 224. The first IC device 202 may be designated as a host system or transmitter, while the second IC device 230 may be designated as a client system or receiver, even if both IC devices 202 and 230 are configured to transmit and receive on the forward channel 222. In one example, the forward channel 222 may operate at a higher data rate when communicating data from a first IC device 202 to a second IC device 230, while the reverse channel 224 may operate at a lower data rate when communicating data from the second IC device 230 to the first IC device 202.

The IC devices 202 and 230 may each have a processor 206, 236 or other processing and/or computing circuit or device. In one example, the first IC device 202 may perform core functions of the apparatus 200, including maintaining communications through an RF transceiver 204 and an antenna 214, while the second IC device 230 may support a user interface that manages or operates a display controller 232. In the example, the second IC device 230 may be adapted to control operations of a camera or video input device using a camera controller 234. Other features supported by one or more of the IC devices 202 and 230 may include a keyboard, a voice-recognition component, and other input or output devices. The display controller 232 may include circuits and software drivers that support displays such as a liquid crystal display (LCD) panel, touchscreen display, indicators and so on. The storage media 208 and 238 may include transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more bus 212 and 246, respectively.

The reverse channel 224 may be operated in the same manner as the forward channel 222, and the forward channel 222 and reverse channel 224 may be capable of transmitting at comparable speeds or at different speeds, where speed may be expressed as data transfer rate and/or clocking rates. The forward and reverse data rates may be substantially the same or differ by orders of magnitude, depending on the application. In some applications, a single bidirectional channel 226 may support communications between the first IC device 202 and the second IC device 230. The forward channel 222 and/or reverse channel 224 may be configurable to operate in a bidirectional mode when, for example, the forward channel 222 and reverse channel 224 share the same physical connections and operate in a half-duplex manner. In one example, the communication link 220 may be operated to communicate control, command and other information between the first IC device 202 and the second IC device 230 in accordance with an industry or other standard.

In some instances, the forward channel 222 and/or reverse channel 224 may be configured or adapted to support a wide video graphics array (WVGA) 80 frames per second LCD driver IC without a frame buffer, delivering pixel data at 810 Mbps for display refresh. In another example, the forward channel 222 and/or reverse channel 224 may be configured or adapted to enable communications between with dynamic random access memory (DRAM), such as double data rate synchronous dynamic random access memory (SDRAM). The drivers 210, 240 may include encoding devices that can be configured to encode multiple bits per clock transition, and multiple sets of wires can be used to transmit and receive data from the SDRAM, control signals, address signals, and other signals.

The forward channel 222 and/or reverse channel 224 may comply with, or be compatible with application-specific industry standards. In one example, the MIPI standard defines physical layer interfaces between an IC device 202 that functions as an application processor and an IC device 230 that supports the camera or display in a mobile device. The MIPI standard includes specifications that govern the operational characteristics of products that comply with MIPI specifications for mobile devices. In some instances, the MIPI standard may define interfaces that employ complimentary metal-oxide-semiconductor (CMOS) parallel busses.

The MIPI Alliance defines standards and specifications that may address communications affecting all aspects of operations in a mobile device, including the antenna, peripherals, the modem and application processors. For example, the MIPI Alliance defines protocols for a camera serial interface (CSI) and a display serial interface (DSI). The MIPI CSI-2 defines a wired interface between a camera and Application Processor and the MIPI DSI or DSI-2 defines a wired interface between an Application Processor and a display. The low-level physical layer (PHY) interface in each of these applications can be MIPI C-PHY or MIPI D-PHY.

MIPI C-PHY Interface

According to certain aspects disclosed herein, systems and apparatus may employ multi-phase data encoding and decoding interface methods for communicating between IC devices 202 and 230. A multi-phase encoder may drive a plurality of conductors (i.e., M conductors). The M conductors typically include three or more conductors, and each conductor may be referred to as a wire, although the M conductors may include conductive traces on a circuit board or within a conductive layer of a semiconductor IC device. In one example, the MIPI Alliance-defined "C-PHY" physical layer interface technology may be used to connect camera and display devices 230 to an application processor (IC device 202). The C-PHY interface employs three-phase symbol encoding to transmit data symbols on 3-wire lanes, or "trios" where each trio includes an embedded clock.

The M conductors may be divided into a plurality of transmission groups, each group encoding a portion of a block of data to be transmitted. An N-phase encoding scheme is defined in which bits of data are encoded in phase transitions and polarity changes on the M conductors. Decoding does not rely on independent conductors or pairs of conductors and timing information can be derived directly from phase and/or polarity transitions in the M conductors. N-Phase polarity data transfer can be applied to any physical signaling interface, including electrical, optical and radio frequency (RF) interfaces.

In the C-PHY example, a three-phase encoding scheme for a three-wire system may define three phase states and two polarities, providing 6 states and 5 possible transitions from each state. Deterministic voltage and/or current changes may be detected and decoded to extract data from the three wires.

Figure 3:
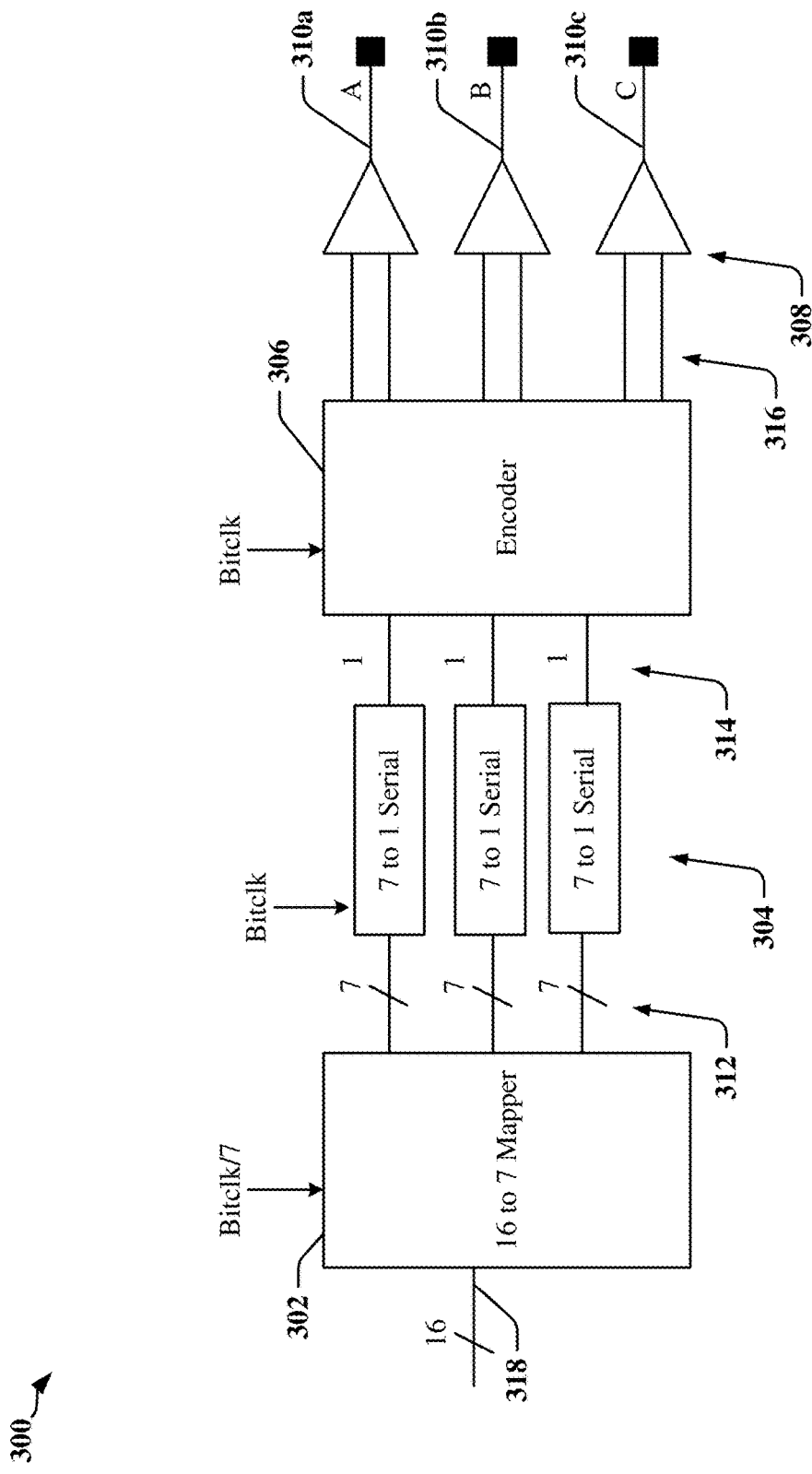
FIG. 3 illustrates an example of a 3-phase polarity data encoder of a C-PHY interface.

FIG. 3 is a schematic diagram illustrating the use of N-phase polarity encoding to implement certain aspects of the communication link 220 depicted in FIG. 2. The illustrated example may relate to a three-wire link or to a portion of a link that has more than three wires. The communication link 220 may include a wired bus having a plurality of signal wires, which may be configured to carry three-phase encoded data in a high-speed digital interface, such as a mobile display digital interface (MDDI). One or more of the channels 222, 224 and 226 may be configured or adapted to use three-phase polarity encoding. The physical layer drivers 210 and 240 may be adapted to encode and decode three-phase polarity encoded data transmitted on link 220. The use of 3-phase polarity encoding provides for high-speed data transfer and may consume half or less of the power of other interfaces because fewer than 3 drivers are active in 3-phase polarity encoded data links 220 at any time. 3-phase polarity encoding circuits in the physical layer drivers 210 and/or 240 can encode multiple bits per transition on the communications link 220. In one example, a combination of three-phase encoding and polarity encoding may be used to support a wide video graphics array (WVGA), 80 frames per second LCD driver IC without a frame buffer, delivering pixel data for display refresh at 810 Mbps over three or more wires.

In the depicted C-PHY example 300, an M-wire, N-phase polarity encoding transmitter is configured for M=3 and N=3. The example of three-wire, three-phase encoding is selected solely for the purpose of simplifying descriptions of certain aspects of this disclosure. The principles and techniques disclosed for three-wire, three-phase encoders can be applied in other configurations of M-wire, N-phase polarity encoders, and may comply or be compatible with other interface standards.

When three-phase polarity encoding is used, connectors such as signal wires 310a, 310b and 310c on a 3-wire bus may be undriven, driven positive, or driven negative. An undriven signal wire 310a, 310b or 310c may be in a high-impedance state. An undriven signal wire 310a, 310b or 310c may be driven or pulled to a voltage level that lies substantially halfway between the positive and negative voltage levels provided on driven signal wires. An undriven signal wire 310a, 310b or 310c may have no current flowing through it. In the example 300, each signal wire 310a, 310b and 310c may be in one of three states (denoted as +1, −1, or 0) using drivers 308. In one example, drivers 308 may include unit-level current-mode drivers. In another example, drivers 308 may drive opposite polarity voltages on two signals transmitted on the signal wires 310a and 310b while the third signal wire 310c is at high impedance and/or pulled to ground. For each transmitted symbol interval, at least one signal is in the undriven (0) state, while the number of signals driven positive (+1 state) is equal to the number of signals driven negative (−1 state), such that the sum of current flowing to the receiver is always zero. For each symbol, the state of at least one signal wire 310a, 310b or 310c is changed from the symbol transmitted in the preceding transmission interval.

In the example, 300, a mapper 302 may receive a 16-bit input data word 318, and the mapper 302 may map the input data word 318 to 7 symbols 312 for transmitting sequentially over the signal wires 310a, 310b and 310c. An M-wire, N-phase encoder 306 configured for three-wire, three-phase encoding receives the 7 symbols 312 produced by the mapper one input symbol 314 at a time and computes the state of each signal wire 310a, 310b and 310c for each symbol interval, based on the immediately preceding state of the signal wires 310a, 310b and 310c. The 7 symbols 312 may be serialized using parallel-to-serial converters 304, for example. The encoder 306 selects the states of the signal wires 310a, 310b and 310c based on the input symbol 314 and the previous states of signal wires 310a, 310b and 310c.

The use of M-wire, N-phase encoding permits a number of bits to be encoded in a plurality of symbols where the bits per symbol is not an integer. In the simple example of a three-wire, three-phase system, there are 3 available combinations of 2 wires, which may be driven simultaneously, and 2 possible combinations of polarity on any pair of wires that is driven simultaneously, yielding 6 possible states. Since each transition occurs from a current state, 5 of the 6 states are available at every transition. The state of at least one wire is typically required to change at each transition. With 5 states, $\log_2(5) \cong 2.32$ bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encodes five states has $5^7$ (78,125) permutations. Accordingly, the 7 symbols may be used to encode the $2^{16}$ (65,536) permutations of 16 bits.

Figure 4:
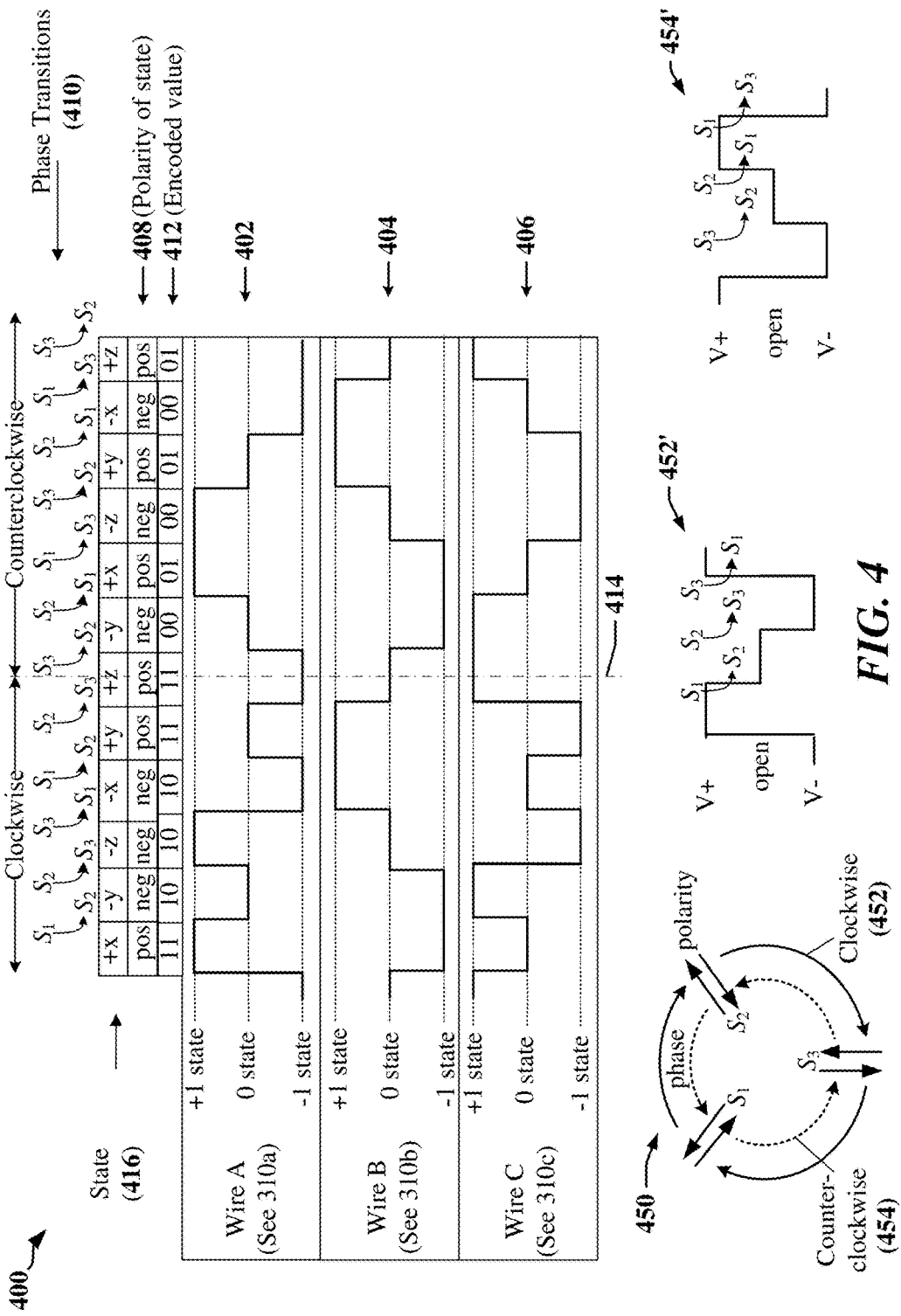
FIG. 4 illustrates signaling in an example of a C-PHY interface.

FIG. 4 illustrates an example of signaling 400 employing a three-phase modulation data-encoding scheme based on the circular state transition diagram 450. According to the data-encoding scheme, a three-phase signal may rotate in two directions and may be transmitted on three signal wires 310a, 310b and 310c. Each of the three signals is independently driven on the signal wires 310a, 310b, 310c. Each of the three signals includes the three-phase signal, with each signal being 120 degrees out of phase relative to the other two signals. At any point in time, each of the three signal wires 310a, 310b, 310c is in a different one of the states {+1, 0, −1}. At any point in time, each of the three signal wires 310a, 310b, 310c in a 3-wire system is in a different state than the other two wires. When more than three conductors or wires are used, two or more pairs of wires may be in the same state. The illustrated encoding scheme may also encode information in the polarity of the two signal wires 310a, 310b and/or 310c that are actively driven to the +1 and −1 states. Polarity is indicated at 408 for the sequence of states depicted.

At any phase state in the illustrated three-wire example, exactly two of the signal wires 310a, 310b, 310c carry a signal which is effectively a differential signal for that phase state, while the third signal wire 310a, 310b or 310c is undriven. The phase state for each signal wire 310a, 310b, 310c may be determined by voltage difference between the signal wire 310a, 310b or 310c and at least one other signal wire 310a, 310b and/or 310c, or by the direction of current flow, or lack of current flow, in the signal wire 310a, 310b or 310c. As shown in the state transition diagram 450, three phase states ($S_1$, $S_2$ and $S_3$) are defined. A signal may flow clockwise from phase state $S_1$ to phase state $S_2$, phase state $S_2$ to phase state $S_3$, and/or phase state $S_3$ to phase state $S_1$ and the signal may flow counter-clockwise from phase state $S_1$ to phase state $S_3$, phase state $S_3$ to phase state $S_2$, and/or phase state $S_2$ to phase state $S_1$. For other values of N, transitions between the N states may optionally be defined according to a corresponding state diagram to obtain circular rotation between state transitions.

In the example of a three-wire, three-phase communications link, clockwise rotations ($S_1$ to $S_2$), ($S_2$ to $S_3$), and/or ($S_3$ to $S_1$) at a state transition 410 may be used to encode a logic 1, while counter-clockwise rotations ($S_1$ to $S_3$), ($S_3$ to $S_2$), and/or ($S_2$ to $S_1$) at the state transition 410 may be used to encode a logic 0. Accordingly, a bit may be encoded at each transition by controlling whether the signal is "rotating" clockwise or counter-clockwise. For example, a logic 1 may be encoded when the three signal wires 310a, 310b, 310c transition from phase state $S_1$ to phase state $S_2$ and a logic 0 may be encoded when the three signal wires 310a, 310b, 310c transition from phase state $S_1$ to phase state $S_3$. In the simple three-wire example depicted, direction of rotation may be easily determined based on which of the three signal wires 310a, 310b, 310c is undriven before and after the transition.

Information may also be encoded in the polarity and/or changes of polarity of state 408 of the driven signal wires 310a, 310b, 310c, or in the direction of current flow or changes in the direction of current flow between two signal wires 310a, 310b, 310c. Signals 402, 404, and 406 illustrate voltage levels applied to signal wires 310a, 310b, 310c, respectively at each phase state in a three-wire, three-phase link. At any time, a first signal wire 310a, 310b, 310c is coupled to a more positive voltage (+V, for example), a second signal wire 310a, 310b, 310c is coupled to a more negative voltage (−V, for example), while the third signal wire 310a, 310b, 310c may be open-circuited. As such, one polarity encoding state may be determined by the current flow between the first and second signal wires 310a, 310b, 310c or the voltage polarities of the first and second signal wires 310a, 310b, 310c. In some embodiments, two bits of data 412 may be encoded in each state transition 410. A decoder may determine the direction of signal phase rotation to obtain the first bit. The second bit may be determined based on the polarity difference between two of the signals 402, 404 and 406. In some instances, the second bit may be determined based on a change or lack of change in polarity of the differential signal transmitted on a pair of the signal wires 310a, 310b, 310c. The decoder having determined direction of rotation can determine the phase state and the polarity of the voltage applied between the two active signal wires 310a, 310b and/or 310c, or the direction of current flow through the two active signal wires 310a, 310b and/or 310c.

In the example of the three-wire, three-phase link described herein, one bit of data may be encoded in the rotation, or phase change in the three-wire, three-phase link, and an additional bit may be encoded in the polarity or changes in polarity of two driven wires. Certain embodiments, encode more than two bits in each transition of a three-wire, three-phase encoding system by allowing transition to any of the possible states from a current state. Given three rotational phases and two polarities for each phase, 6 states are defined, such that 5 states are available from any current state. Accordingly, there may be $\log_2(5) \cong 2.32$ bits per symbol (transition) and the mapper may accept a 16-bit word and convert it to 7 symbols. In other words, a three-wire, three-phase C-PHY link may map the 16 bits of the input data word 318 to the 7 symbols 312.

In other examples, an encoder may transmit symbols using 6 wires with two pairs of wires driven for each state. The 6 wires may be labeled A through F, such that in one state, wires A and F are driven positive, wires B and E negative, and C and D are undriven (or carry no current). For six wires, there may be:

$$C(6, 4) = \frac{6!}{(6-4)! \cdot 4!} = 15$$

possible combinations of actively driven wires, with:

$$C(4, 2) = \frac{4!}{(4-2)! \cdot 2!} = 6$$

different combinations of polarity for each phase state.

The 15 different combinations of actively driven wires may include:

| | | | | |
|---|---|---|---|---|
| A B C D | A B C E | A B C F | A B D E | A B D F |
| A B E F | A C D E | A C D F | A C E F | A D E F |
| B C D E | B C D F | B C E F | B D E F | C D E F |

Of the 4 wires driven, the possible combinations of two wires driven positive (and the other two must be negative). The combinations of polarity may include:

++−− +−−+ +−+− −+−+ −++− −−++

Accordingly, the total number of different states may be calculated as 15×6=90. To guarantee a transition between symbols, 89 states are available from any current state, and the number of bits that may be encoded in each symbol may be calculated as: $\log_2(89) \cong 6.47$ bits per symbol. In this example, a 32-bit word can be encoded by the mapper into 5 symbols, given that 5×6.47=32.35 bits.

The general equation for the number of combinations of wires that can be driven for a bus of any size, as a function of the number of wires in the bus and number of wires simultaneously driven:

$$C(N_{wires}, N_{driven}) = \frac{N_{wires}!}{(N_{wires} - N_{driven})! \cdot N_{driven}!}$$

The equation for the number of combinations of polarity for the wires being driven is:

$$C\left(N_{driven}, \frac{N_{driven}}{2}\right) = \frac{N_{driven}!}{\left(\left(\frac{N_{driven}}{2}\right)!\right)^2}$$

The number of bits per symbol is:

$$\log_2\left(C(N_{wires}, N_{driven}) \cdot C\left(N_{driven}, \frac{N_{driven}}{2}\right) - 1\right).$$

Figure 5:
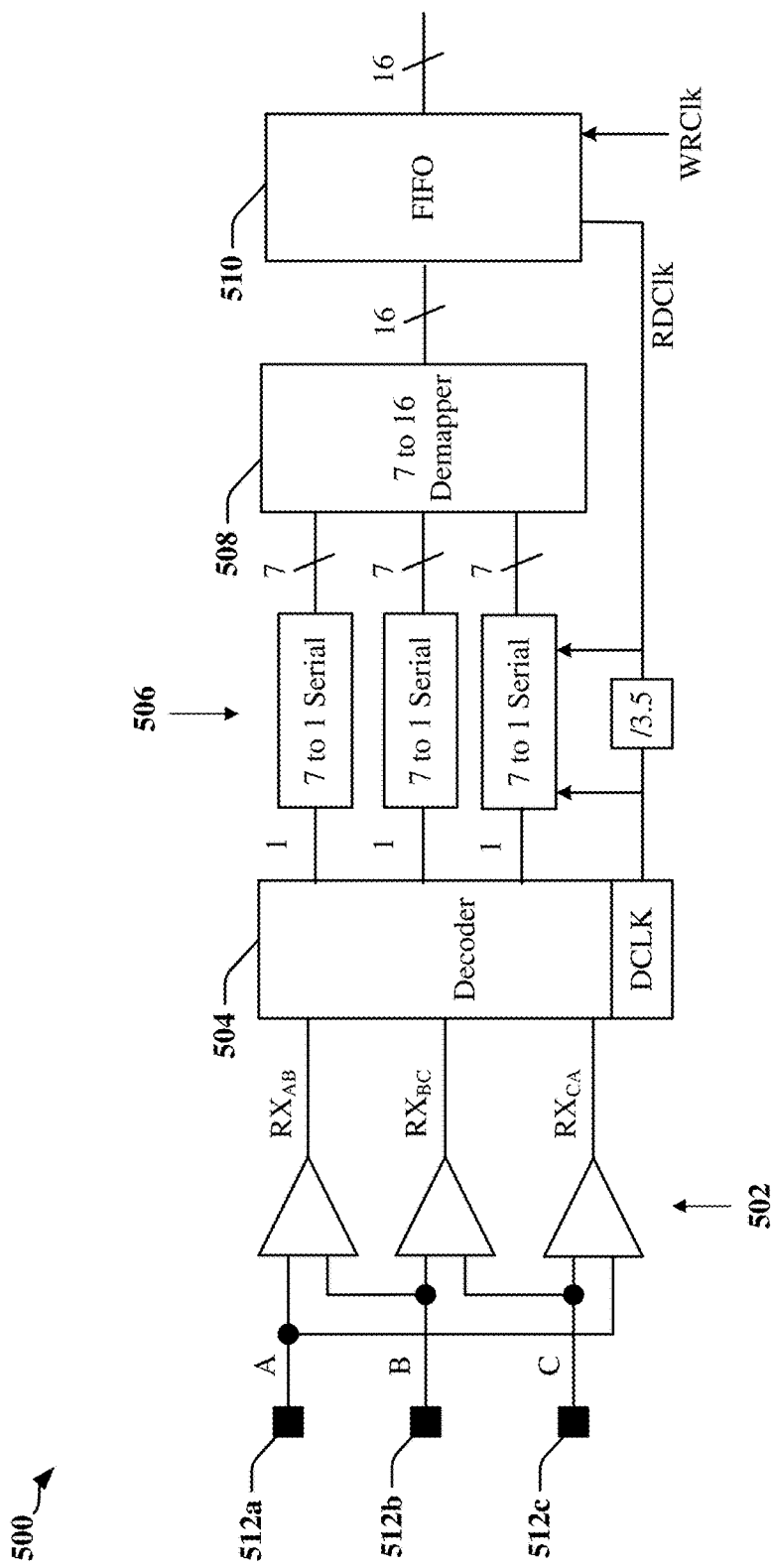
FIG. 5 illustrates certain aspects of a receiver in a C-PHY interface.

FIG. 5 illustrates an example of a receiver 500 in a three-wire, three-phase PHY. The three-wire, three-phase example is illustrative of certain principles of operation applicable to other configurations of M-wire, N-phase receivers. Comparators 502 and decoder 504 are configured to provide a digital representation of the state of each of three transmission lines 512a, 512b and 512c, as well as the change in the state of the three transmission lines compared to the state transmitted in the previous symbol period. Seven consecutive states are assembled by serial-to-parallel convertors 506 to produce a set of 7 symbols to be processed by a demapper 508 to obtain 16 bits of data that may be buffered in a first-in-first-out (FIFO) storage device 510, which may be implemented using registers, for example.

According to certain aspects disclosed herein, a plurality of three-state amplifiers can be controlled to produce a set of output states defined by a differential encoder, an N-phase polarity encoder, or another encoder that encodes information in wires or connectors that can assume one of the three states described.

With reference again to FIGS. 2 and 3, the communication link 220 may include a high-speed digital interface that can be configured to support both differential encoding scheme and N-phase polarity encoding. Physical layer drivers 210 and 240 may include N-phase polarity encoders and decoders, which can encode multiple bits per transition on the interface, and line drivers to drive signal wires 310a, 310b and 310c. The line drivers may be constructed with amplifiers that produce an active output that can have a positive or negative voltage, or a high impedance output whereby a signal wires 310a, 310b or 310c is in an undefined state or a state that is defined by external electrical components. Accordingly, the output drivers 308 may receive by a pair of signals 316 that includes data and output control (high-impedance mode control). In this regard, the three-state amplifiers used for N-phase polarity encoding and differential encoding can produce the same or similar three output states.

Figure 6:
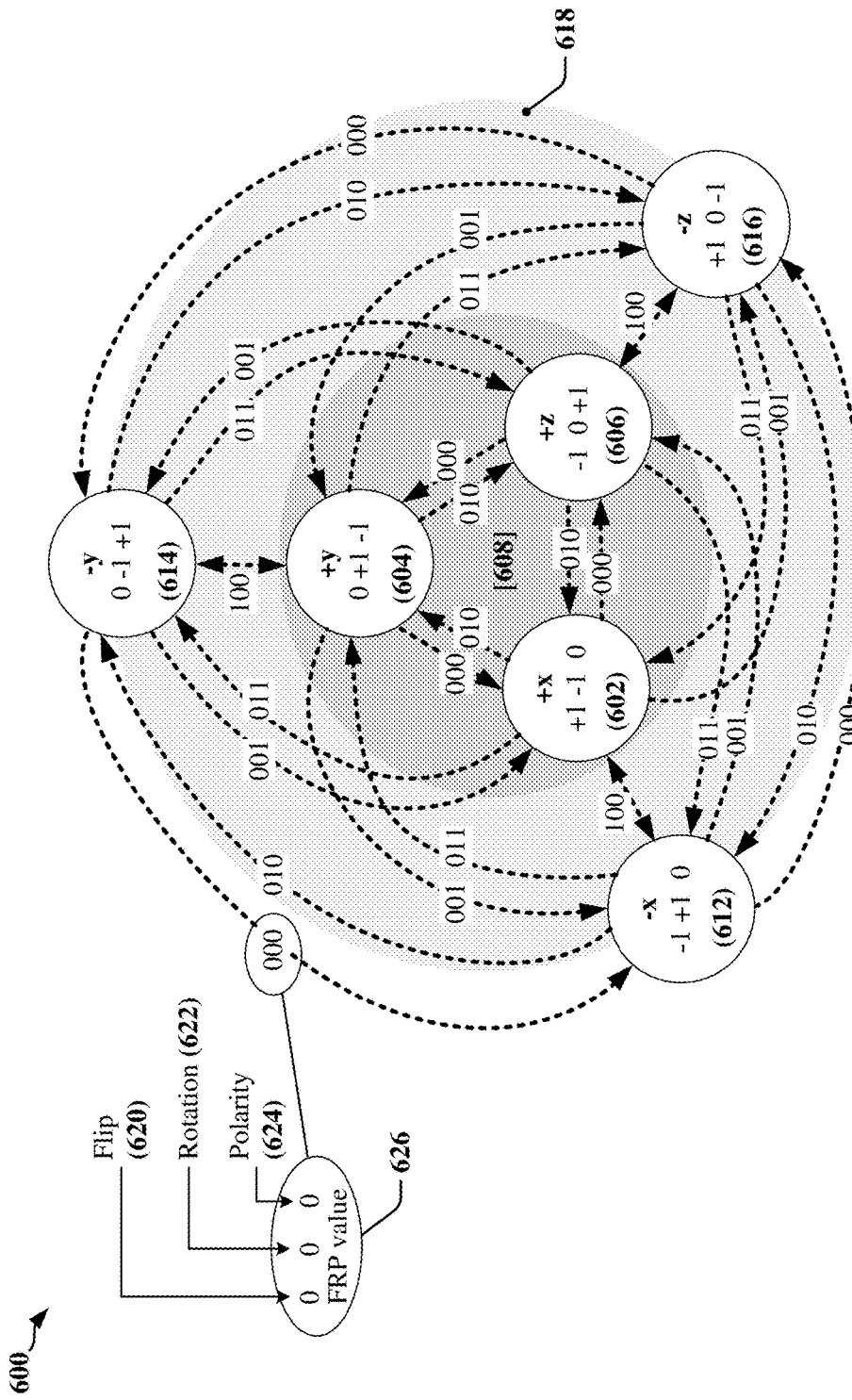
FIG. 6 is state diagram illustrating all possible signaling states and transitions in a 3-wire 3-phase interface.

FIG. 6 is state diagram 600 illustrating all possible signaling states 602, 604, 606, 612, 614, 616 of the three wires, with all possible transitions illustrated from each state. The transitions in the state diagram 600 can be represented by a Flip, Rotate, Polarity (FRP) symbol 626 that has one of the three-bit binary values in the set: {000, 001, 010, 011, 100}. The Rotation bit 622 of the FRP symbol 626 indicates the direction of phase rotation associated with a transition to a next state. The Polarity bit 624 of the FRP symbol 626 is set to binary 1 when a transition to a next state involves a change in polarity. When the Flip bit 620 of the FRP symbol 626 is set to binary 1, the Rotate and Polarity values may be ignored and/or zeroed. A flip represents a state transition that involves only a change in polarity. Accordingly, the phase of a 3-phase signal is not considered to be rotating when a flip occurs and the polarity bit is redundant when a flip occurs. The FRP symbol 626 corresponds to wire state changes for each transition. The state diagram 600 may be separated into an inner circle 608 that includes the positive polarity states 602, 604, 606 and an outer circle 618 that encompasses the negative polarity states 612, 614, 616.

MIPI D-PHY Interface

According to certain aspects disclosed herein, systems and apparatus may employ some combination of differential and single-ended encoding for communicating between IC devices 202 and 230. In one example, the MIPI Alliance-defined "D-PHY" physical layer interface technology may be used to connect camera and display devices 230 to an application processor (IC device 202). The D-PHY interface can switch between a differential (High-speed) mode and a single-ended (Low Power) mode in real time as needed to facilitate the transfer of large amounts of data or to conserve power and prolong battery life. The D-PHY interface is capable of operating in simplex or duplex configuration with single data lane or multiple data lanes with a unidirectional (Master to Slave) clock lane.

Figure 7:
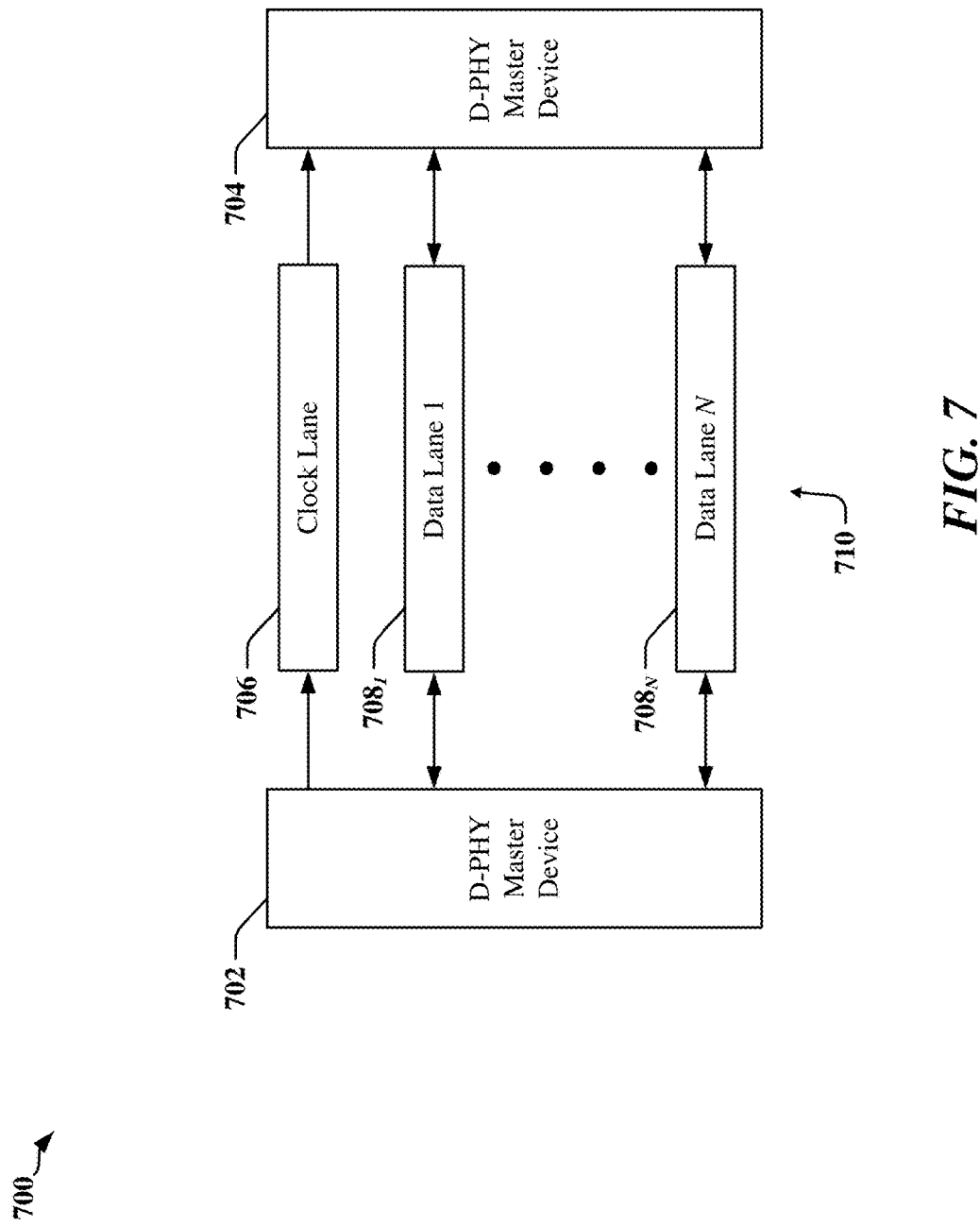
FIG. 7 illustrates an example of signaling lanes that may be employed in a D-PHY interface.

FIG. 7 illustrates a generalized D-PHY configuration 700 that includes a master device 702 and a slave device 704. The master device 702 generates clock signals that control transmissions on the wires 710. A clock signal is transmitted on a clock lane 706 and data is transmitted in one or more data lanes $708_1$-$708_N$. The number of data lanes $708_1$-$708_N$ that are provided or active in a device may be dynamically configured based on application needs, volumes of data to be transferred and power conservation needs.

Figure 8:
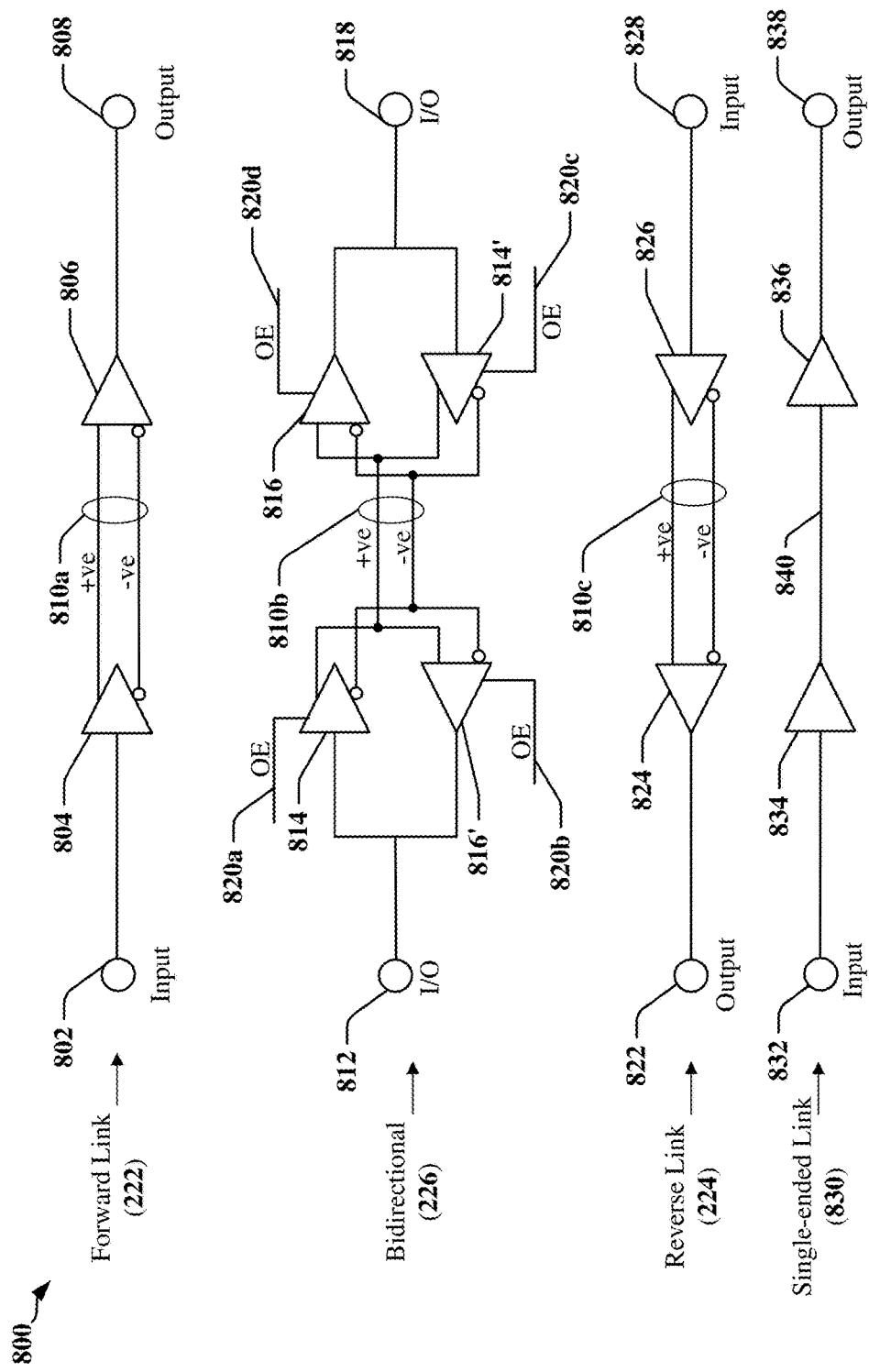
FIG. 8 illustrates certain aspects of a configuration of drivers and receivers in a D-PHY interface.

FIG. 8 is a schematic diagram 800 illustrating differential signaling that may be employed in a D-PHY implementation of the communication link 220 (see FIG. 2). Differential signaling typically involves transmitting information electrically using two complementary signals sent on a pair of wires 810a, 810b or 810c, which may be referred to as a differential pair. The use of differential pairs can significantly reduce electromagnetic interference (EMI) by canceling the effect of common-mode interference that affects both wires in a differential pair. On the forward channel 222, a pair of wires 810a may be driven by a host differential driver 804. The differential driver 804 receives a stream of input data 802 and generates positive and negative versions of the input data 802, which are then provided to the pair of wires 810a. The differential receiver 806 on the client side generates an output data stream 808 by performing a comparison of the signals carried on the pair of wires 810a.

On the reverse channel 224, one or more pairs of wires 810c may be driven by a client-side differential driver 826. The differential driver 826 receives a stream of input data 828 and generates positive and negative versions of the input data 828, which are provided to the pair of wires 810c. The differential receiver 824 on the host generates an output data stream 822 by performing a comparison of the signals carried on the pair of wires 810c.

In a bidirectional channel 226, the host and client may be configured for half-duplex mode and may transmit and receive data on the same pair of wires 810b. A bidirectional bus may alternatively or additionally be operated in full-duplex mode using combinations of the forward and reverse differential drivers 804, 826 to drive multiple pairs of wires 810a, 810c. In the half-duplex bidirectional implementation depicted for the bidirectional channel 226, the differential drivers 814 and 814' may be prevented from driving the pair of wires 810b simultaneously using, for example, an output enable (OE) control 820a, 820c (respectively) to force the differential drivers 814 and 814' into a high impedance state. The differential receiver 816' may be prevented from driving the input/output 812 while the differential driver 814 is active, typically using an OE control 820b to force the differential receiver 816' into a high impedance state. The differential receiver 816 may be prevented from driving the input/output 818 while the differential driver 814' is active, typically using an OE control 820d to force the differential receiver 816 into a high impedance state. In some instances, the outputs of the differential drivers 814 and 814' and the differential receivers 816 and 816' may be in a high-impedance state when the interface is not active. Accordingly, the OE controls 820a, 820c, 820b and 820c of the differential drivers 814, 814', and the differential receivers 816 and 816' may be operated independently of one another.

Each of the differential drivers 804, 814, 814' and 826 may include a pair of amplifiers, one receiving at one input the inverse of the input of the other amplifier. The differential drivers 804, 814, 814' and 826 may each receive a single input and may have an internal inverter that generates an inverse input for use with a pair of amplifiers. The differential drivers 804, 814, 814' and 826 may also be constructed using two separately controlled amplifiers, such that their respective outputs can be placed in high impedance mode independently of one another.

When a D-PHY implementation of the communication link 220 (see FIG. 2) is operated in Low Power mode, signals may be transmitted on single wire data and/or clock lanes. In one example, the differential drivers 804, 814, and/or 826 may be reconfigured or controlled such that only one of the wires in a pair of wires 810a, 810b or 810c of an active lane is driven. In other examples, the differential drivers 804, 814, and/or 826 may be turned off or placed in a high-impedance output mode, and separate, single-ended line driver 834 and receiver 836 may be used for communications over a single-wire, single-ended link 840. In some instances, the input 832 and output 838 of the single-ended link 840 may be bidirectional, and both transmitting and receiving devices may employ a transceiver that includes both a line driver 834 and a receiver 836 that is controlled in accordance with one or more protocols.

Figure 9:
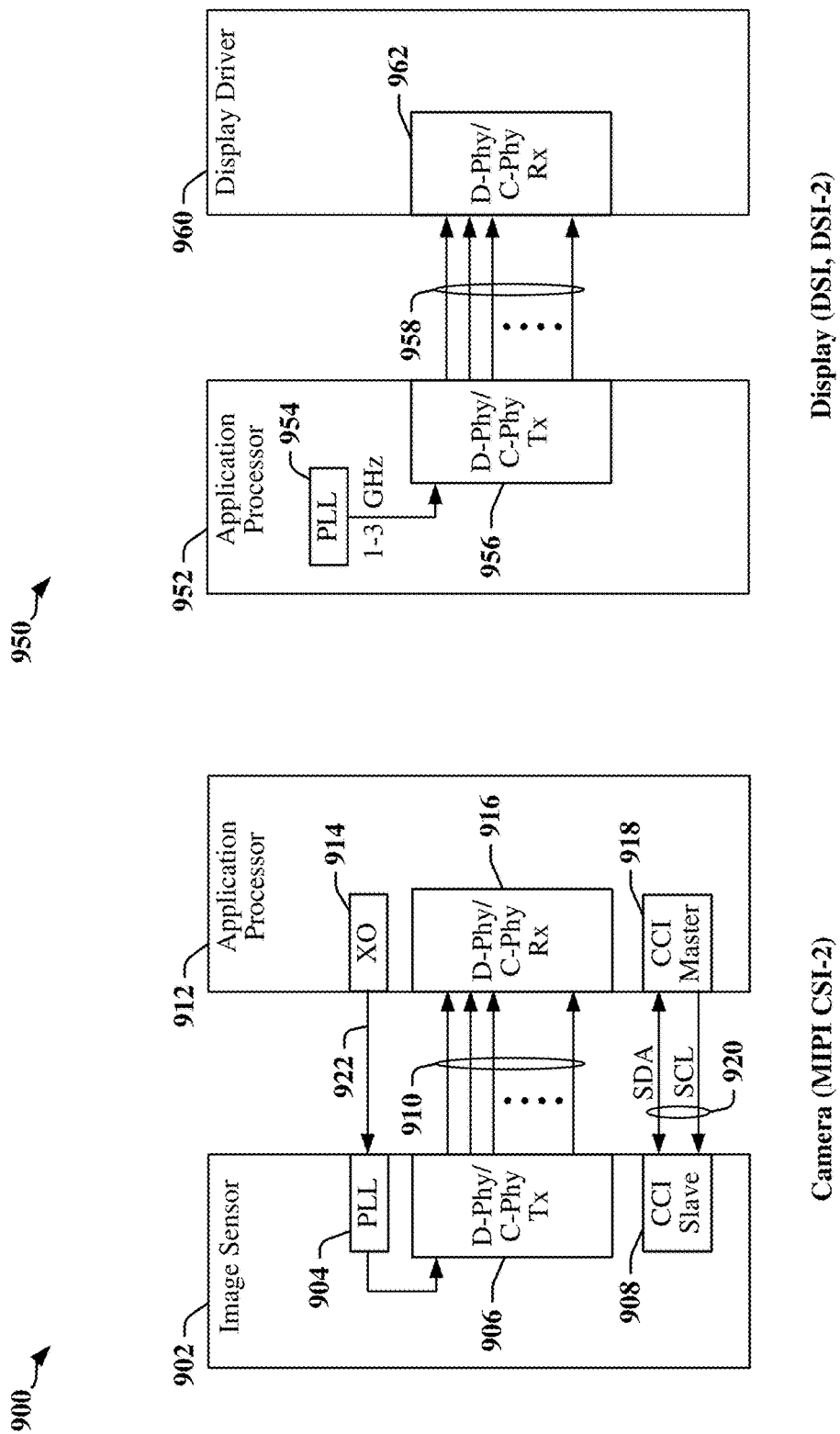
FIG. 9 illustrates examples of apparatus that may be adapted according to certain aspects disclosed herein.

FIG. 9 illustrates certain interface configurations associated with a camera subsystem 900 and a display subsystem 950 that may be deployed within a mobile device, for example. The camera subsystem 900 may include a CSI-2 defined communication link between an image sensor 902 and an application processor 912. The communication link may include a high-data rate data transfer link 910 used by the image sensor 902 to transmit image data to the application processor 912 using a transmitter 906. The high-data rate data transfer link 910 may be configured and operated according to D-PHY or C-PHY protocols. The application processor 912 may include a crystal oscillator (XO) 914 or other clock source to generate a clock signal 922 that controls the operation of the transmitter 906. The clock signal 922 may be processed by a phase-locked loop (PLL) 904 in the image sensor 902. In some instances, the clock signal 922 may also be used by the D-PHY or C-PHY receiver 916 in the application processor 912. The communication link may include a Camera Control Interface (CCI), which is similar in nature to the Inter-Integrated Circuit (I2C) interface. The CCI bus may include Serial Clock (SCL) line that carries a clock signal and a Serial Data (SDA) line that carries data. The CCI link 920 may be bidirectional and may operate at a lower data rate than the high-data rate data transfer link 910. The CCI link 920 may be used by the application processor 912 to transmit control and data information to the image sensor 902 and to receive control and configuration information from the image sensor 902. The application processor 912 may include a CCI bus master 918 and the image sensor 902 may include a CCI slave 908.

The display subsystem 950 may include a unidirectional data link 958, which may be configured and operated according to D-PHY or C-PHY protocols. In the application processor 952, a clock source such as the PLL 954 may be used to generate a clock signal for controlling transmissions on the data link 958. At the display driver 960, a D-PHY or C-PHY receiver 962 may extract embedded clock information from sequences of symbols transmitted on the data link, or from a clock lane provided in the data link 958.

Devices adapted according to certain aspects disclosed herein may resolve issues arising from the complexities and hindrances associated with the use of optical media to extend the length of communication links that compliant or compatible with MIPI standards. Certain aspects disclosed herein relate to systems, apparatus and methods that support a broad range of interface protocols, and that can operate using different physical media. As shown in FIG. 9, for example, the camera subsystem 900 and/or display subsystem 950 may communicate high data rate information using D-PHY or C-PHY protocols and, in some configurations, may communicate using a reverse channel (e.g. the CCI link 920) for configuration of an image sensor 902 or other device. In some instances, a low power mode of operation may be defined for links that use either D-PHY or C-PHY protocols.

Low-Power and High-Speed Signaling in C-PHY and D-PHY Interfaces

Figure 10:
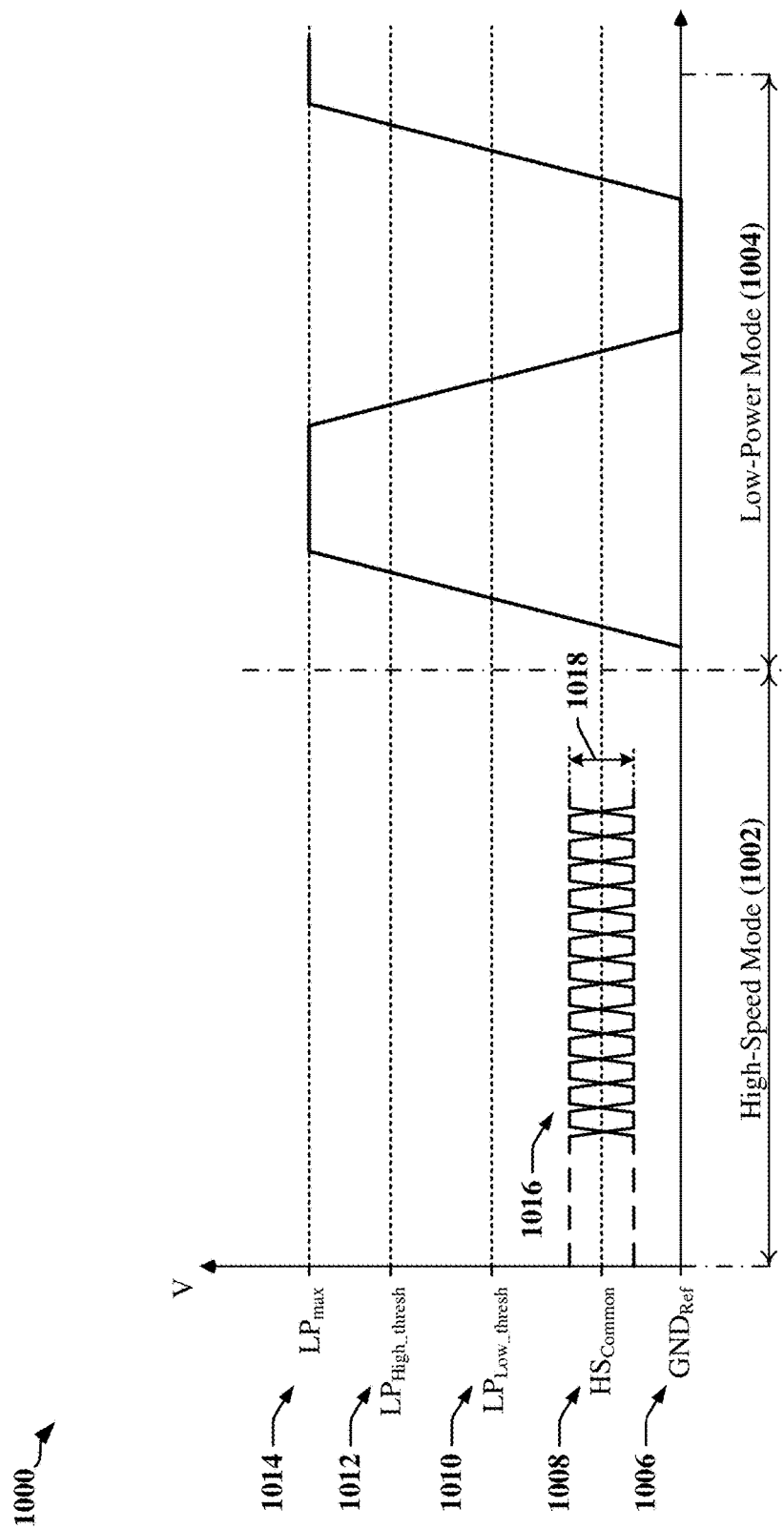
FIG. 10 illustrates high-speed and low-power signaling in C-PHY and D-PHY interfaces.

FIG. 10 is a graphical representation 1000 of waveforms illustrating certain aspects of signaling in D-PHY and C-PHY interfaces. The D-PHY and C-PHY interfaces support a high-speed communication mode 1002 and a low-power communication mode 1004, which may be referred to as LP mode or legacy low-power mode. Data is transmitted at a significantly lower rate in the low-power communication mode 1004 than in the high-speed communication mode 1002. The high-speed communication mode 1002 and the low-power communication mode 1004 operate at different voltage levels and voltage ranges when transmitting signal using the same wires of a serial bus.

In the high-speed communication mode 1002, signals are centered on a high-speed common ($HS_{Common}$) voltage level 1008, which is offset from a reference ground voltage level 1006. Signals in the high-speed communication mode 1002 have a voltage range 1018 that ensures that high-speed signals 1016 do not exceed a logic low threshold voltage level ($LP_{Low\_thresh}$) 1010, which defines the upper limit for logic low in the low-power communication mode 1004. In one D-PHY example, the $HS_{Common}$ voltage level 1008 may be nominally defined to be 200 millivolts (mV), and the voltage range 1018 for high-speed signals may be nominally defined to be 200 mV. In one C-PHY example, the $HS_{Common}$ voltage level 1008 may be nominally defined to be 250 millivolts (mV), and the voltage range 1018 for high-speed signals may be nominally defined to be 250 mV.

In the low-power communication mode 1004, signals switch between a maximum low-power ($LP_{max}$) voltage level 1014 and the reference ground voltage level 1006. The logic low voltage levels $LP_{Low\_thresh}$ 1010 and the logic high threshold voltage level ($LP_{High\_thresh}$) 1012 define the switching voltage levels for high-to-low transitions and low-to high transitions, respectively. In one example, the maximum low-power ($LP_{max}$) voltage level 1014 may be nominally defined at 1.2 Volts (V).

Figure 11:
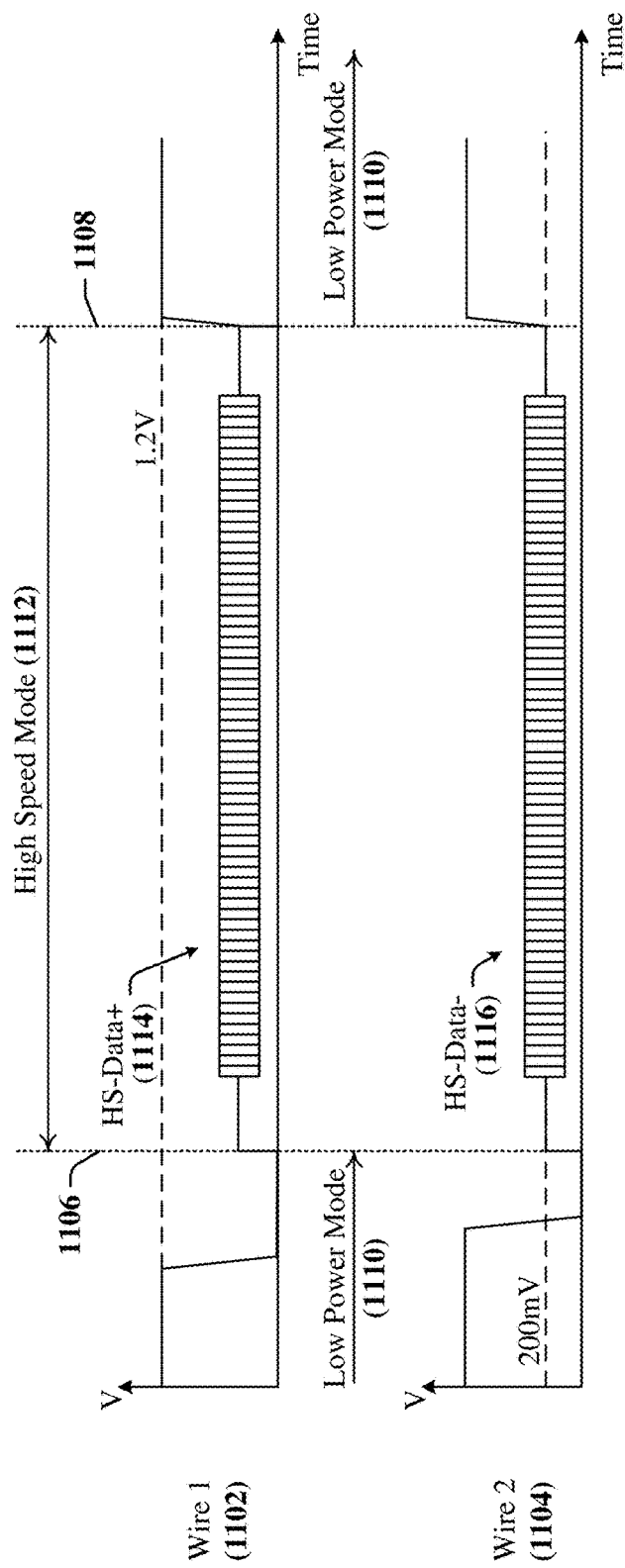
FIG. 11 illustrates transitions between signaling modes in an example of a D-PHY interface.

FIG. 11 is a graphical representation 1100 of waveforms illustrating transitions between communication modes using an example of a D-PHY interface. The example relates to two wires 1102, 1104 of a clock or data lane of a communication link. The D-PHY interface may be configured to operate in a low-power mode 1110 and/or a high-speed mode 1112. In the low-power mode 1110, a first wire carries data signals at a relatively low data rate and with a voltage level swing of approximately 1.2 volts. In the high-speed mode 1112, the first and second wires 1102, 1104 carry a low-voltage differential signal that may have a data rate that is orders of magnitude faster than the data rate of the low-power mode 1110. For example, the low-power mode 1110 may support data rates up to 10 megabits per second (Mbps) while the high-speed mode 1112 may support data rates that lie between 80 Mbps and 4.5 gigabits per second (Gbps). The positive version of the differential signal may be carried on the first wire 1102, while the negative version is carried on the second wire 1104, in the high-speed mode 1112. The differential signal may have a relatively low amplitude voltage swing, which in one example may be approximately 200 millivolts (mV).

In conventional C-PHY and D-PHY interfaces, receivers can use voltage level detectors to switch between high-speed and low-power modes of operation.

Low-Voltage, Lower-Power Mode for C-PHY and D-PHY Interfaces

Progress in device technology has resulted in ever-decreasing feature sizes in IC devices. Decreasing feature size has prompted a need or desire to reduce operating voltage levels for IC devices. The combination of lower gate capacitance and low voltage operation can enable higher frequency switching and increased data rates. Certain aspects disclosed herein provide signaling and protocol enhancements that enable low-power modes of operation in C-PHY and D-PHY interfaces to operate at reduced voltage levels in an advanced low-power (ALP) mode. The ALP mode may also be referred to herein as alternate low-power mode.

According to certain aspects, ALP mode in a C-PHY interface can replace high-voltage levels with transmissions of unique code words that are used only for lane signaling events. These unique code words may be selected to produce sequences of symbols that are not produced by the mapper 302 (see FIG. 3), and ambiguity in the interpretation of these codes at the receiver is avoided. As illustrated in FIGS. 4 and 6, the high-speed mode signaling states include the +x, −x, +y, −y, +z and −z states.

When a C-PHY interface is operated in ALP mode, transmissions of unique code words substitute for the transmission of LP pulse sequences in conventional interfaces. In one example, the stop state may be signaled in a special sequence that includes a unique code word (Post2) followed by a signaling state in which the voltage of all three wires of a lane are in the same voltage state. This signaling state may be referred to as ALP-Pause herein, and may be further defined as including an ALP-Pause Stop and/or ALP-Pause ULPS. ALP-Pause Stop and ALP-Pause ULPS may be defined by setting the voltages of the three wires to the same voltage level ($V_A=V_B=V_C$). At the receiver 500, the output of each of the comparators 502 is '0.' As discussed further in reference to FIG. 19, a low-power receiver 1922 can be used to detect the difference in differential levels between the ALP-Pause state ($V_{OD}=0$) and ALP-Pause Wake state ($V_{OD}=|V_{OD}|$ Strong). The use of a low-power receiver 1922 can minimize power consumption while lane activity has ceased during one of the ALP-Pause states.

According to certain aspects, high-voltage signaling states used to manage and control conventional low-power modes may be replaced by code words transmitted at low voltages. The high-voltage signaling may be used in MIPI D-PHY and C-PHY interfaces to indicate key events such as the start of transmission (SoT), end of transmission (EoT), Escape mode and bus turnaround. In conventional D-PHY and C-PHY interfaces, signaling levels are in many cases more than double the voltage used for high-speed differential signaling. A primary advantage of the high-voltage signaling is that it can be easily and reliably detected at the receiving side. It is particularly important to be able to detect the EoT. When low-voltage differential signaling is used in the ALP mode described herein, the voltage-based detection of EoT is not possible in a D-PHY system, and certain challenges arise to reliably determining whether the interface is in HS mode, LP mode, ALP mode, or an ultralow-power (ULP) mode.

The use of predefined ranges of transmission frequencies can further minimize power consumption when code words are transmitted in accordance with 3-Phase or differential encoding schemes. Code words may be used to signal low-power (LP) state events. Hierarchical code words may be defined to improve the efficiency of control code transmissions. For example, a single code word such as a SoT code word may replace a sequence of line state indications such as LP-11, LP-01, LP-00, which are transmitted in D-PHY interfaces or LP-111, LP-001, LP-000, which are transmitted in C-PHY interfaces.

In one implementation, multiple modes of ALP operation may be defined in accordance with certain aspects disclosed herein. For example, during normal operation in ALP Mode, a lane can be operated in an ALP-Pause, ALP-Pause Wake, or High-Speed mode. High-Speed data transmission may be initiated from, and terminate in the ALP-Pause state. The lane may operate in High-Speed mode during data bursts and during ALP signaling. ON example of a sequence for entering High-Speed mode for data bursts or ALP signaling may be defined as: ALP-Pause Wake followed by a preamble consisting of all symbols that are all "1" symbols or "3" symbols. Code words can be sent after the preamble to define the purpose of the burst.

In ALP modes, the certain unique code words are transmitted to perform the same functions as the functions performed by transmission of LP pulse sequences in ALP mode. In one example, the stop state may be implemented by transmitting a special sequence including a unique code word followed by setting the voltage of all three wires in a lane to the same signaling state. This signaling state may be referred to as the ALP-Pause. In one example, the ALP-Pause can be further defined as an ALP-Pause Stop or an ALP-Pause ULPS. ALP-Pause may be defined by the relationship of wire voltages: $V_A=V_B=V_C$. At the receiver, the ALP-Pause may be detected when the output of the comparators 502 (see FIG. 5) by the relationship of wire voltages: $RX_{AB}=RX_{BC}=RX_{CA}=0$. To minimize power consumption while Lane activity has ceased during one of the ALP-Pause states, a special receiver (see e.g., ULP receivers 1912 and 1964 in FIG. 19) can be used to detect the difference in differential levels between the ALP-Pause state ($V_{OD}=0$) and ALP-Pause Wake state ($V_{OD}=|V_{OD}|$ Strong).

Figure 12:
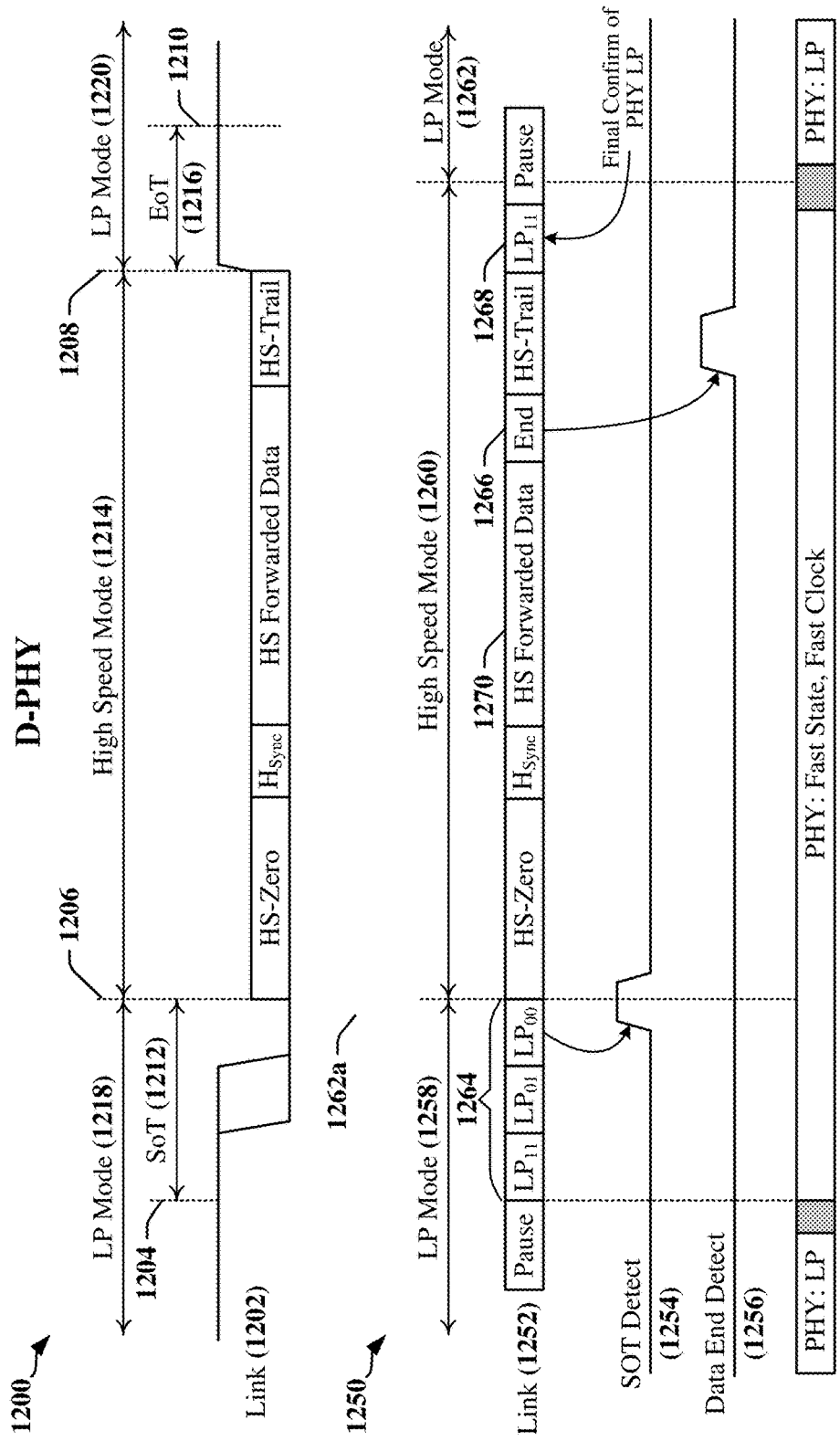
FIG. 12 illustrates transitions between signaling modes in a D-PHY interface adapted in accordance with certain aspects disclosed herein.

FIG. 12 illustrates transitions between communication modes of a D-PHY interface for a conventional mode of operation 1200 and certain aspects of an ALP mode of operation 1250 in a D-PHY interface. In the conventional mode of operation 1200 the D-PHY interface is initially configured for a low-power mode of operation 1218. Commencing at a first time 1204, the SoT sequence 1212 is transmitted to switch the D-PHY interface to a high-speed mode of operation 1214. Commencing at a second time 1208, an EoT sequence 1216 is transmitted to return the D-PHY interface to a low-power mode of operation 1220. A receiver may determine that a return of the D-PHY interface to a low-power mode of operation 1220 is desired based on signaling received at the higher voltage levels of the low-power mode.

According to certain aspects disclosed herein, a D-PHY interface adapted to support an ALP mode of operation 1250 transitions between high-speed and low-power modes in response to sequences of code words 1264, 1266 and 1268. In the ALP mode of operation 1250, low-voltage differential signaling is used for high-speed mode 1260 and for low-power mode 1258, 1262. Accordingly, transitions between high-speed mode 1260 and low-power mode 1258, 1262 may not be detectable using the voltage level sensors employed in certain conventional D-PHY interfaces. Sequences of code words 1264, 1266 and 1268 used in ALP mode of operation 1250 are transmitted to convey corresponding transition and/or other events. Included in the code words 1264, 1266 and 1268 is a Data End Packet that is provided at the end of a high-speed data transmission by a protocol element or unit to provide a reliable notification of the end of a high-speed burst to the D-PHY. The Data End Packet may be provided as a short packet that is guaranteed by a Protocol Unit in the transmitter to be the last packet transmitted in the HS Forward Data field 1270. At the receiver, a receiver Protocol Unit can detect the Data End Packet and provide a control signal to the receiver D-PHY indicating that the packet was detected (see FIG. 17), so that the receiver D-PHY can timely change its reception state to the low-power state. In the low-power state, the power consumption of the PHY is reduced and the PHY receives code words at a substantially slower rate, as compared to the data rate of the high-speed data.

Figure 13:
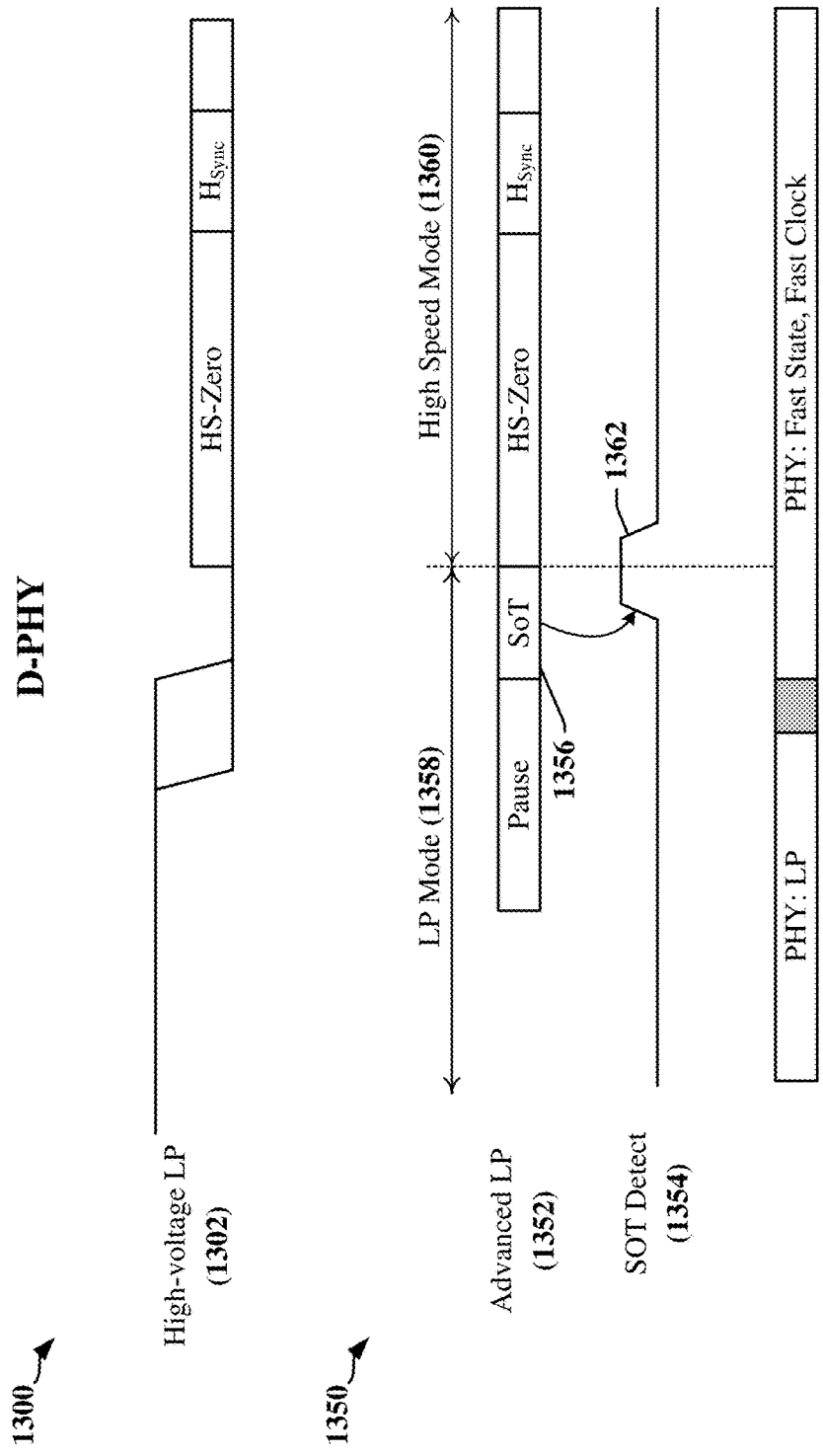
FIG. 13 illustrates use of a short-cut to effect a change in states in a D-PHY interface adapted in accordance with certain aspects disclosed herein.

According to certain aspects, and with reference to FIG. 13, one or more short-cuts 1356 can be defined in a D-PHY interface adapted to support an ALP mode of operation 1350. In the illustrated example, four low-power states may be defined, and the short-cut 1356 can avoid the use of a series of codes for each of the four low-power states, as is typically required in conventional high-voltage, low-power signaling 1302. A short-cut may also be used to convey certain other events such as Escape Mode Entry, Escape Mode Entry, and Ultra Low Power State Escape Mode Action. In some instances, transmission of the single code word short-cut 1356 for SoT can replace LP-11, LP-01, LP-00 codes.

Figure 14:
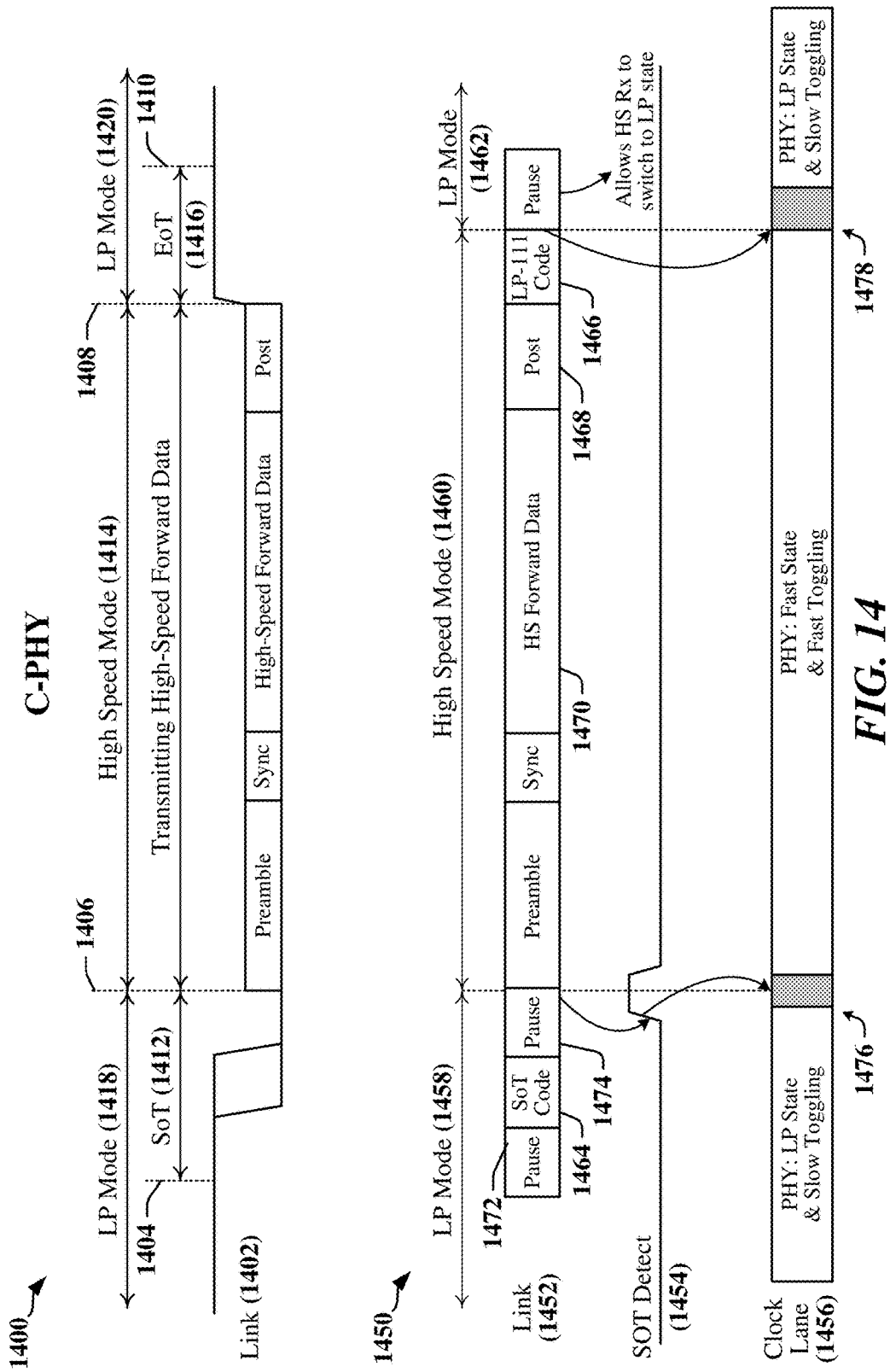
FIG. 14 illustrates transitions between signaling modes in a C-PHY interface adapted in accordance with certain aspects disclosed herein.

FIG. 14 illustrates transitions between communication modes of a C-PHY interface for a conventional mode of operation 1400 and transitions between communication modes in an ALP mode of operation 1450 in a C-PHY interface. In the conventional mode of operation 1400 the C-PHY interface is initially configured for a low-power mode of operation 1418. Commencing at a first time 1404, the SoT sequence 1412 is transmitted to switch the C-PHY interface to a high-speed mode of operation 1414. Commencing at a second time 1408, an EoT sequence 1416 is transmitted to return the C-PHY interface to a low-power mode of operation 1420. A receiver may determine that the return the C-PHY interface to a low-power mode of operation 1420 is desired based on signaling received at the higher voltage levels of the low-power mode.

According to certain aspects disclosed herein, a C-PHY interface adapted to support an ALP mode of operation 1450, transitions between high-speed and low-power modes in response to code words 1464, 1466 and a Post sequence 1468 defined by C-PHY protocols. In the ALP mode of operation 1450, low-voltage differential signaling is used for high-speed mode 1460 and for low-power mode 1458, 1462. Accordingly, transitions between high-speed mode 1460 and for low-power mode 1458, 1462 are not detectable using the voltage level sensors employed in some conventional C-PHY interfaces. Code words 1464 and 1466 and the Post sequence 1468 used in ALP mode of operation 1450 may be transmitted to convey corresponding mode transitions and/or other events. In the C-PHY example, a Post sequence 1468 is already provided at the end of a high-speed data transmission to provide a reliable notification of the end of a high-speed burst to the receiver. In C-PHY protocols, the Post sequence 1468 is provided at the end of HS Forward Data 1470 and the PHY knows that the high-speed transmission is ended by detecting the Post sequence 1468. The Post sequence 1468 includes a series of unmapped code words (e.g., a sequence in which all symbols have a value of "4"). A start of transmission (SoT) code word 1464 may be transmitted to initiate the high-speed mode 1460. The SoT code word 1464 may include a sequence of code words. In one example, the SoT code word 1464 may be defined as the sequence {LP-111, LP-001, LP-000}. The SoT code word 1464 may be preceded by a first pause 1472 and followed by a second pause 1474.

In a C-PHY interface, symbol timing is embedded in the waveform, and there is no need to manage the transmission clock signal during transitions between high-speed mode 1460 and low-power modes 1458, 1462. According to certain aspects disclosed herein, all of the LP Escape Mode Code Words in a C-PHY interface (see Table 1 below) can use in whole or in part, unique C-PHY sequences of seven or more symbols that are not created by the C-PHY data mapping function. This allows the C-PHY receiver to reliably detect all of the code words without having to rely as much on the specific state of transmission. While in the high-speed transmission mode, the C-PHY receiver can always recover to the correct power state.

As illustrated in FIG. 14, a clock lane at 1456, which may be representative of clock generation circuits or clock extraction circuits, may begin transitioning from low-power mode 1458 to high-speed mode 1460 during the pause 1474 that occurs after the SoT code word 1464 has been transmitted on the on the link 1452. The transition from low-power mode 1458 to high-speed mode 1460 may include pausing state low-power state toggling and enabling high-speed mode terminations (see FIG. 27). Transition from high-speed mode 1460 to a next low-power mode 1562 may be commenced after the LP-111 code has been transmitted on the on the link 1452. The transition from high-speed mode 1460 to a next low-power mode 1562 may include pausing high-speed state toggling and enabling high-speed mode terminations.

In some instances, signals may be toggled only when a code needs to be transmitted when the PHY is in a low-power state. In some instances, continuous clock mode may be implemented where one lane toggles on a regular basis during low-power state. Continuous clock mode version may support certain implementations where some link activity is required or desired, including links that include optical media and/or links that operate in accordance with MIPI DSI-2 specifications.

According to certain aspects, a master device may be configured to select a clock rate used in low-power and/or other modes.

According to certain aspects, a code word may be defined to signal the clock and data termination states.

Figure 15:
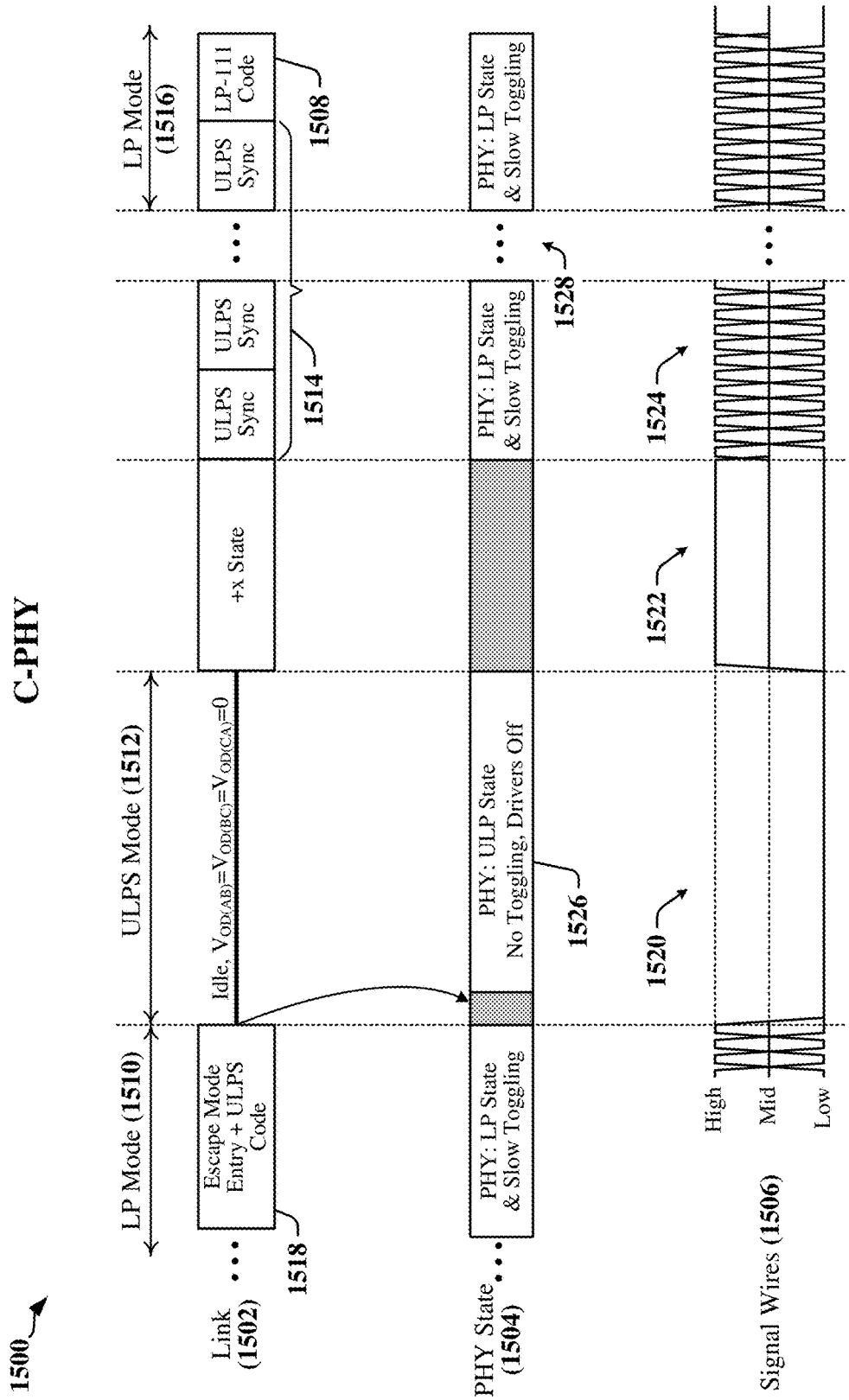
FIG. 15 illustrates certain aspects of operation of a C-PHY interface adapted to support an advanced low-power mode of operation in accordance with certain aspects disclosed herein.

FIG. 15 illustrates certain aspects of operation of a C-PHY interface adapted to support an ALP mode of operation in accordance with certain aspects disclosed herein. The link is initially in a LP mode 1510. The PHY state 1504 is also in LP mode and may provide slow toggling signals. The master device may signal entry into an ultra-low power state (ULPS) 1512. The entry to the ULPS 1512 may be signaled using an escape sequence that includes a mode entry command and ULPS code. The link may then be idled, and in the PHY ULPS 1526, line drivers and other circuits may be turned off or otherwise disabled, and the signal wires 1506 do not toggle. Exit from ULPS mode 1512 may be initiated when the master device enables its drivers, and proceeds to drive the signal wires 1506 to the +x state 1522 in order to wake up the system, and/or the configuration of wiring between the transmitter and receiver. Other wire states may be used as desired, the +x state being selected based on configuration of the detection circuit of the C-PHY receiver 1900 (see FIG. 19). The master device may then transmit a sequence of Sync symbols 1514 from ULPS state to enable entry into the LP mode 1516. The Sync symbols 1514 cause the signal wires 1506 to slowly toggle 1524 as the link is activated.

Figure 16:
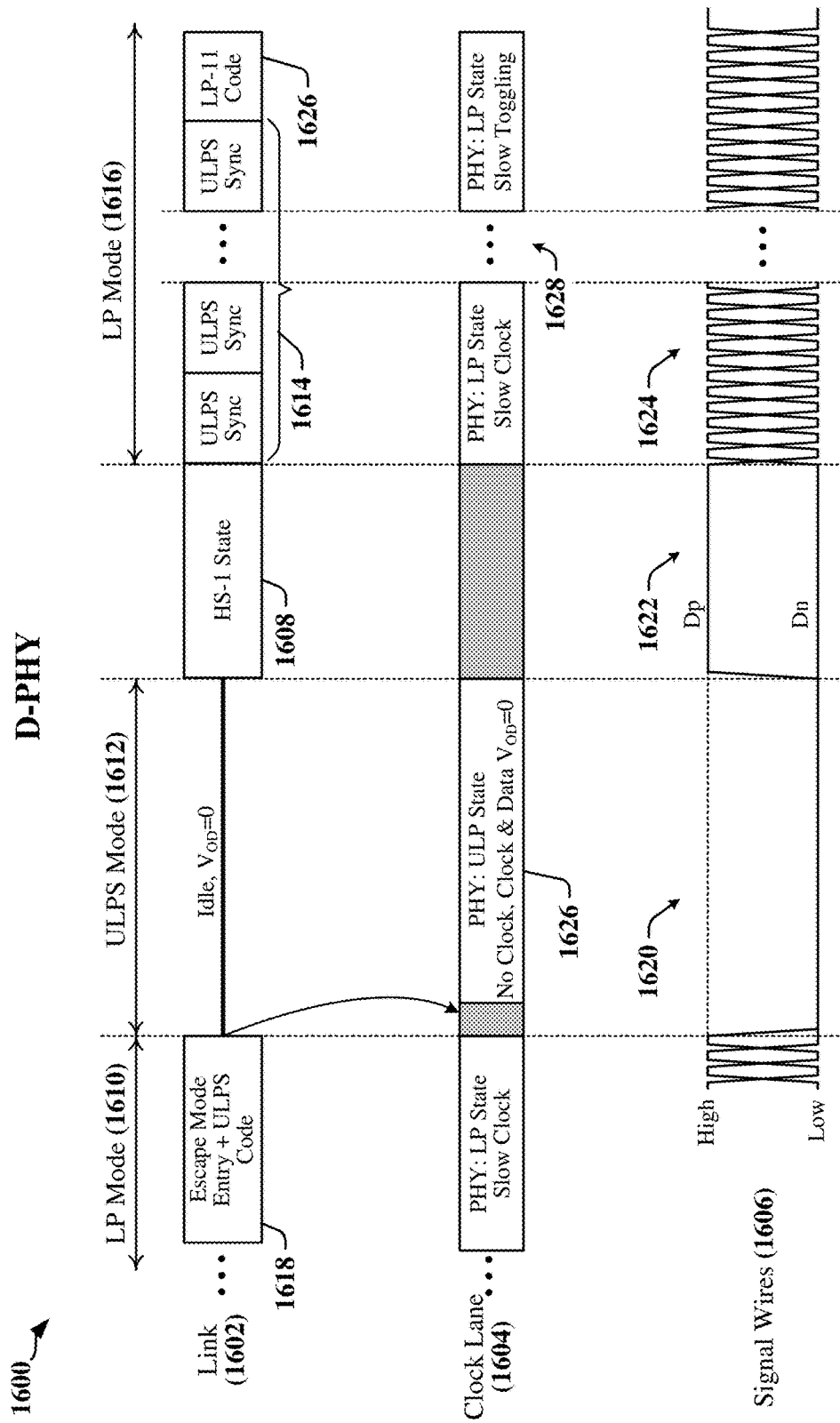
FIG. 16 illustrates certain aspects of operation of a D-PHY interface adapted to support an advanced low-power mode of operation in accordance with certain aspects disclosed herein.

FIG. 16 illustrates certain aspects of operation of a D-PHY interface adapted to support an ALP mode of operation in accordance with certain aspects disclosed herein. The link is initially in a LP mode 1610. The PHY state 1604 is also in LP mode and may provide a slow toggling clock signal. The transmitting device may signal entry into an ultra-low power state (ULPS) 1612. The entry to the ULPS 1612 may be signaled using an escape sequence that includes a mode entry command and ULPS code. The link may then be idled, and in the PHY ULPS 1626, line drivers and other circuits may be turned off or otherwise disabled, such that the signal wires 1606 do not toggle. Both of the signal wires 1606 may be driven to the same voltage level during PHY ULPS 1626 and, from a differential receiver perspective, are in an invalid signaling state. Exit from ULPS 1612 may be initiated when the transmitting device enables its drivers, and proceeds to drive the signal wires 1606 to a valid signaling state 1622 in order to wake up the system. The transmitting device may then transmit a sequence of Sync symbols from ULPS state to enable entry into the LP mode 1616. The Sync symbols may cause the signal wires 1606 to toggle 1624 as the link is activated.

Figure 17:
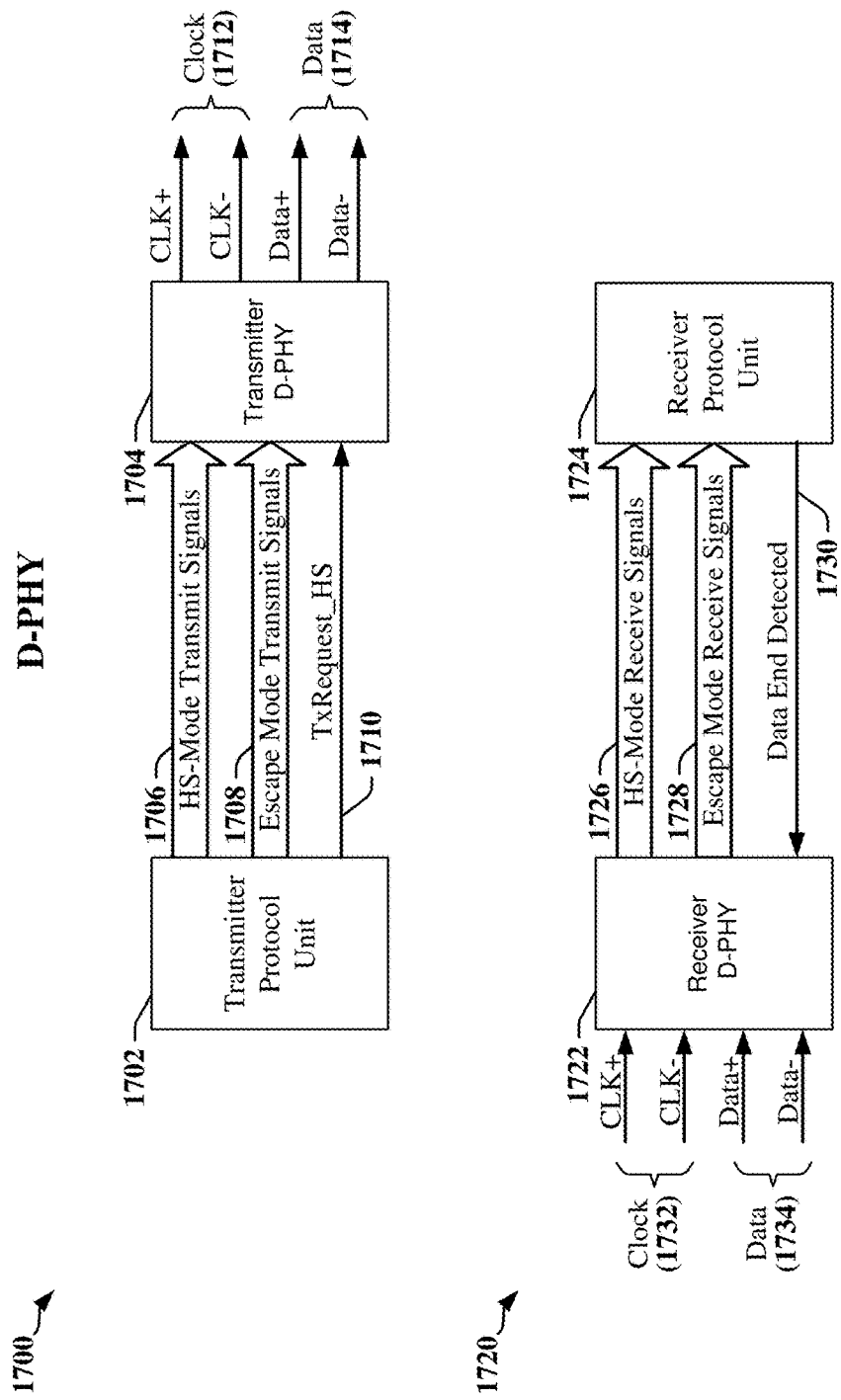
FIG. 17 illustrates a configuration of an apparatus showing signals provided between elements of a D-PHY interface adapted in accordance with certain aspects disclosed herein.

FIG. 17 illustrates a configuration of an apparatus showing signals provided between Protocol Units 1702, 1724 and PHY 1704, 1722 in a D-PHY transmitter 1700 and a D-PHY receiver 1720. In the D-PHY transmitter 1700, the transmitter Protocol Unit 1702 generates and provides the transmitter D-PHY 1704 with high-speed mode transmit signals 1706 and Escape mode transmit signals 1708. The transmitter Protocol Unit 1702 may also provide the transmitter D-PHY 1704 with a control signal (TxRequest_HS signal 1710) that indicates when the transmitter D-PHY should be configured for high-speed mode of operation. The transmitter D-PHY 1704 transmits a clock signal on a clock lane 1712 and data on one or more data lanes 1714.

At the D-PHY receiver 1720, a receiver D-PHY 1722 receives a clock signal from the clock lane 1732 and data from one or more data lanes 1734 and provides received high-speed mode signals 1726 and Escape mode signals 1728 to the receiver Protocol Unit 1724. The receiver Protocol Unit 1724 can detect the Data End Packet and provide a control signal (Data_End_Detected 1730) to the receiver D-PHY 1722 indicating that the Data End packet was detected.

Figure 18:
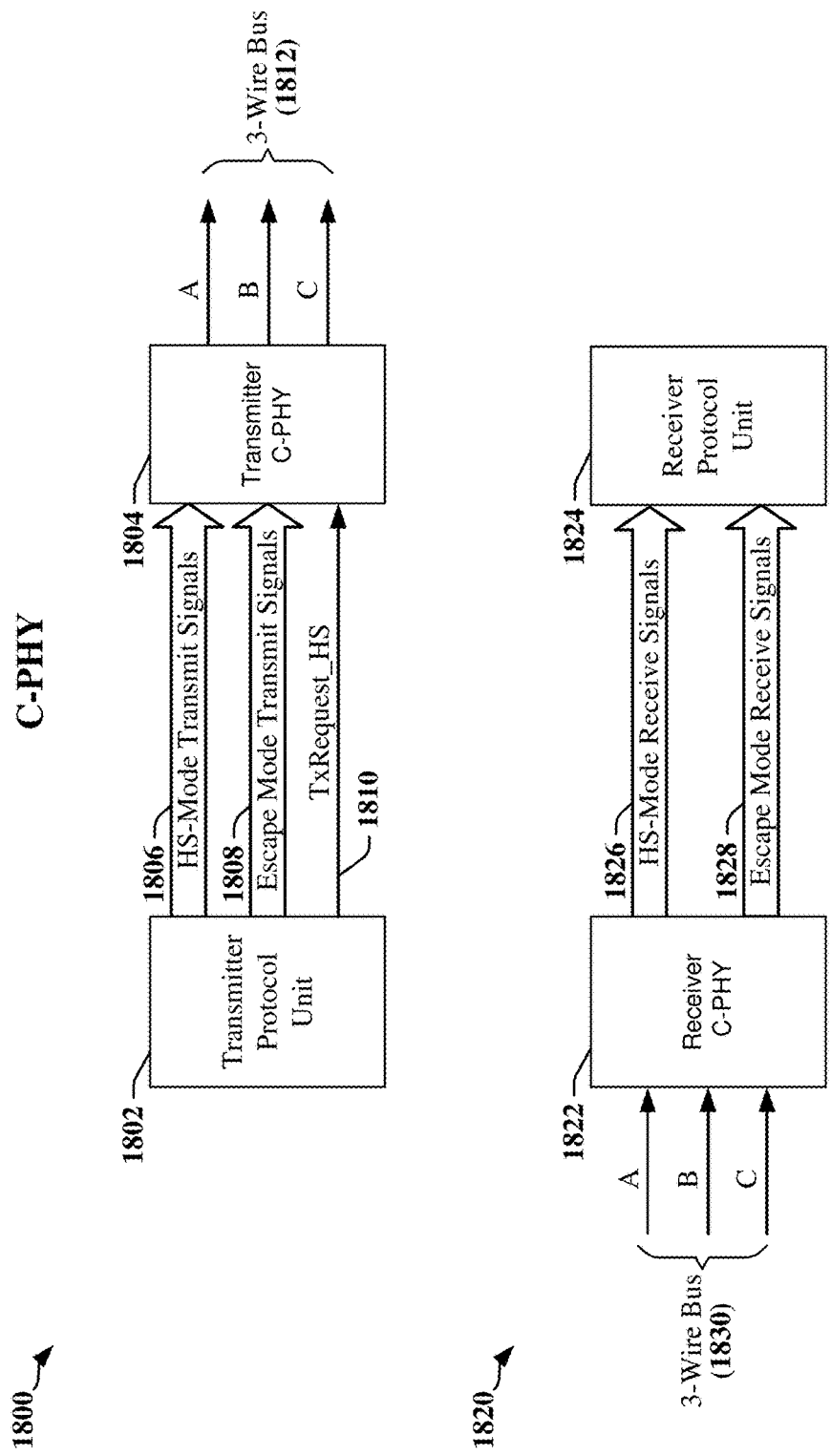
FIG. 18 illustrates a configuration of an apparatus showing signals provided between elements of a C-PHY interface adapted in accordance with certain aspects disclosed herein.

FIG. 18 illustrates a configuration of an apparatus showing signals provided between Protocol Units 1802, 1824 and PHY 1804, 1822 in a C-PHY transmitter 1800 and a C-PHY receiver 1820. In the C-PHY transmitter 1800, the transmitter Protocol Unit 1802 generates and provides the transmitter C-PHY 1804 with high-speed mode transmit signals 1806 and Escape mode transmit signals 1808. The transmitter Protocol Unit 1802 may also provide the transmitter C-PHY 1804 with a control signal (TxRequest_HS signal 1810) that indicates when the transmitter C-PHY should be configured for high-speed mode of operation. The transmitter C-PHY 1804 transmits data on a 3-wire bus 1812. At the C-PHY receiver 1820, a receiver C-PHY 1822 receives data from a 3-wire bus 1830 and provides received high-speed mode signals 1826 and Escape mode signals 1828 to the receiver Protocol Unit 1824.

Certain differences may be observed in the operation of D-PHY and C-PHY interfaces that have been adapted in accordance with certain aspects disclosed herein. In a D-PHY system, the code words are transmitted and detected in the low-power mode of operation and the ultralow-power mode of operation. The transmission of high-speed data does not create a code word that would unintentionally affect the Power State of the receiver D-PHY. While this is also true for C-PHY, it is also true that it is not possible to transmit any of the code words in high-speed data because the codes words use unmapped symbol sequences in the code, which are not available for encoding data. The C-PHY system can re-initialize itself to the proper power state when it detects a code word at any time.

Figure 19:
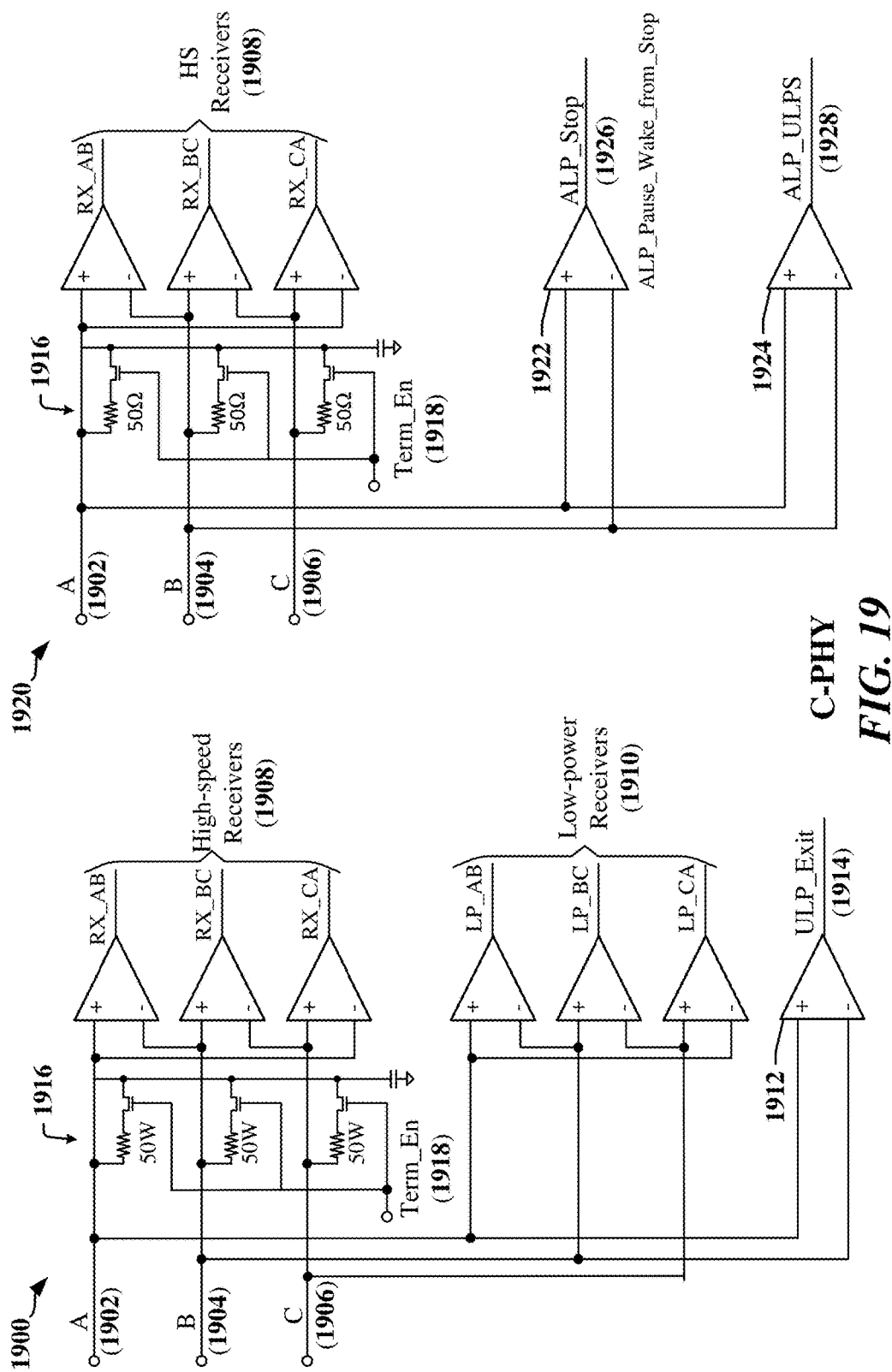
FIG. 19 illustrates certain aspects of C-PHY receiver circuits may be configured for ultra-low-power operation in accordance with certain aspects disclosed herein.

FIG. 19 illustrates examples in which C-PHY receiver circuits 1900 and 1920 may be configured for ULPS operation in accordance with certain aspects disclosed herein. In one example, a C-PHY receiver circuit 1900 and 1920 may be embodied in the C-PHY receiver 1820 of FIG. 18. In another example, a C-PHY receiver circuit 1900 and 1920 may be adapted to perform certain functions of the C-PHY receiver 1820 of FIG. 18.

A first C-PHY receiver circuit 1900 may include separate high-speed receivers 1908 and low-power receivers 1910 that are coupled to the three wires 1902, 1904, 1906 of the C-PHY interface. In some instances, a single set of receivers may be configurable for high-speed and low-power modes. For example, a single set of receivers may have configurable comparison circuits that operate at configurable bias current levels. In the first C-PHY receiver circuit 1900, the low-power receivers 1910 may operate using a small bias current that limits the responsiveness of the low-power receivers and which may limit the speed of the link to approximately 50 mega-symbols per second (50 Msps).

The first C-PHY receiver circuit 1900 may include an ultra-low-power (ULP) receiver 1912 coupled to two wires 1902, 1904 of the C-PHY interface. Here, the ULP receiver 1912 is configured to monitor the A wire 1902 and the B wire 1904 in order to detect the transition of the two wires 1902, 1904 from ULPS state 1520 to the +x state 1522 (see FIG. 15), in order to provide a ULP_Exit signal 1914 that causes the first C-PHY receiver 1900 to wake from ULPS mode. The ULP receiver 1912 may be configured with a small offset voltage (100 mV, for example), and may operate using a very small bias current, resulting in a slowed response time that is greater than 10 µsec. The response time of the ULP receiver 1912 may determine the duration of the +x state 1522.

The first C-PHY receiver circuit 1900 may operate in a variety of power modes. In one mode, the receiver termination resistors can be enabled in the "Rx PHY HS State" and "Rx PHY LP State." The Term_en signal 1918 can be controlled such that. For example, the ZTERM resistors 1916 can be disabled for shorter physical channel lengths, and enabled for longer physical channel lengths. In the "Rx PHY LP State" the HS receivers 1908 can be disabled. In the "Rx PHY ULP State" the HS receivers 1908 and the LP receivers 1910 can be disabled.

A second C-PHY receiver circuit 1920 may include high-speed receivers 1908 that are coupled to the three wires 1902, 1904, 1906 of the C-PHY interface. The second C-PHY receiver circuit 1920 may include low-power receivers 1922, 1924 that are coupled to two of the three wires 1902, 1904, 1906. In some instances, one or more of the high-speed receivers 1908 may be configurable for high-speed and low-power modes. For example, one of the high-speed receivers 1908 may have a configurable comparison circuit that operates at configurable bias current levels. Low-power receivers may operate using a small bias current that limits the responsiveness of the low-power receivers and which may limit the speed of the link to approximately 50 mega-symbols per second (50 Msps).

The second C-PHY receiver circuit 1920 may include an ultra-low-power (ULP) receiver 1924 coupled to two wires 1902, 1904 of the C-PHY interface. Here, the ULP receiver 1924 is configured to monitor the A wire 1902 and the B wire 1904 in order to detect the transition of the two wires 1902, 1904 from ULPS state 1520 to the +x state 1522 (see FIG. 15), in order to provide a ULP_Exit signal 1914 that causes the second C-PHY receiver circuit 1920 to wake from ULPS mode. The ULP receiver 1924 may be configured with a small offset voltage (100 mV, for example), and may operate using a very small bias current, resulting in a slowed response time that is greater than 10 µsec. The response time of the ULP receiver 1924 may determine the duration of the +x state 1522.

The second C-PHY receiver circuit 1920 may operate in a variety of power modes. In one mode, the receiver termination resistors can be enabled in the "Rx PHY HS State" and "Rx PHY LP State." The Term_en signal 1918 can be controlled such that, for example, the ZTERM resistors 1916 are disabled for shorter physical channel lengths, and enabled for longer physical channel lengths. In the "Rx PHY LP State" the HS receivers 1908 can be disabled.

In various examples, the wake state may be indicated by presence of signaling states of any pair of the three wires 1902, 1904, 1906 (A/B, B/C, or C/A). The signaling state indicating that the interface should wake up may be obtained by repetitively transmitting one or more raw symbols represented by corresponding one or more FRP symbols 626 (see FIG. 6).

Figure 20:
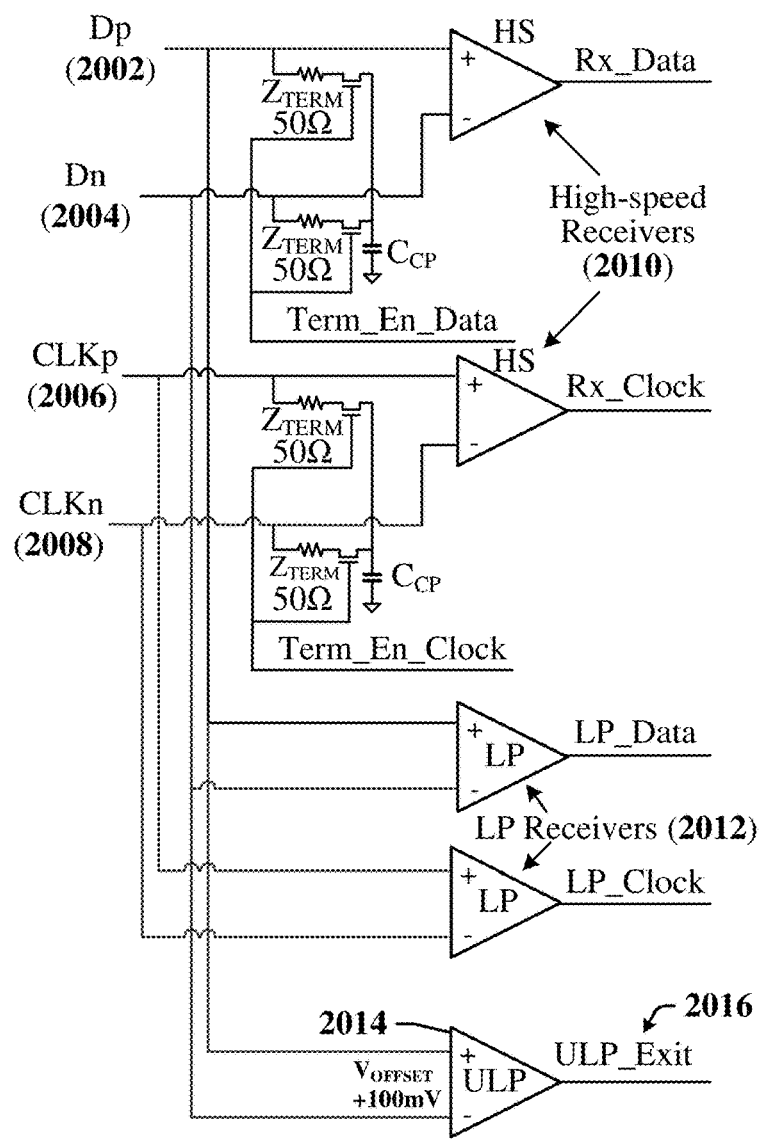
FIG. 20 illustrates certain aspects of a D-PHY receiver circuit that may be configured for ultra-low-power operation in accordance with certain aspects disclosed herein.

FIG. 20 illustrates an example of a D-PHY receiver circuit 2000 that may be configured for ULPS operation in accordance with certain aspects disclosed herein. In one example, the D-PHY receiver circuit 2000 may be embodied in the D-PHY receiver 1722 in FIG. 17. In another example, the D-PHY receiver circuit 2000 may perform certain functions of the D-PHY receiver 1722 in FIG. 17.

In the D-PHY receiver circuit 2000, separate high-speed receivers 2010 and low-power receivers 2012 are coupled to the four wires 2002, 2004, 2006, 2008 of the D-PHY interface. In some instances, a single set of receivers may be configurable for high-speed and low-power modes. For example, a single set of receivers may have configurable comparison circuits that operate at configurable bias current levels. In the D-PHY receiver circuit 2000, the low-power receivers 2012 may operate using a small bias current that limits the responsiveness of the low-power receivers and which may limit the speed of the link to approximately 50 mega-symbols per second (50 Mbps).

The D-PHY receiver circuit 2000 may include an ultra-low-power (ULP) receiver 2014 coupled to two wires 2002/2004, 2006/2008 of the D-PHY interface in order to detect a valid signaling state. In the illustrated example, the ULP receiver 2014 is coupled to the data wires 2002, 2004 of the D-PHY data interface. In some instances, the ULP receiver 2014 may be coupled to the clock wires 2016, 2018 of the D-PHY data interface. The ULP receiver 2014 is configured to monitor the two wires 2002/2004, 2006/2008 and provide a ULP_Exit signal 2016 that causes the D-PHY receiver circuit 2000 to wake from ULPS mode. The ULP receiver 2014 may be configured with a small offset voltage (100 mV, for example), and may operate using a very small bias current, resulting in a slowed response time that is greater than 10 μsec. The response time of the ULP receiver 2014 may determine the duration of the valid signaling state 1622 used as a wakeup from the ULPS 1612 (see FIG. 16).

Figure 21:
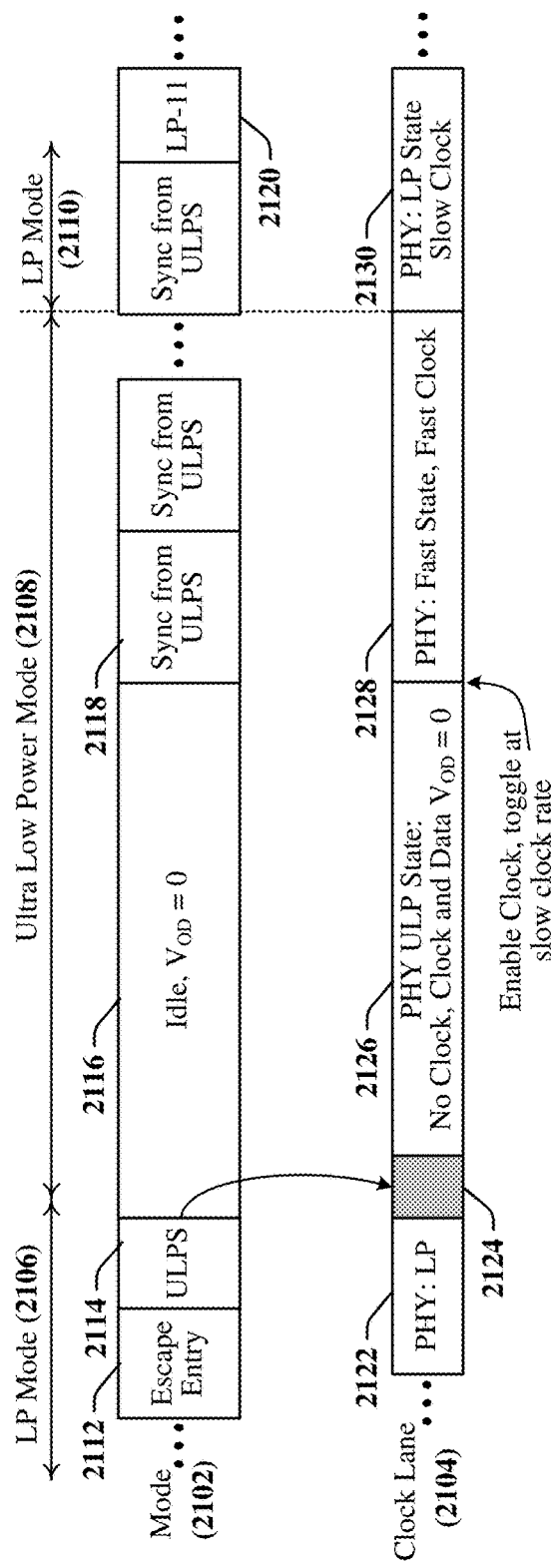
FIG. 21 illustrates an example of transitions to and from an ultralow-power mode in a D-PHY interface adapted in accordance with certain aspects disclosed herein.
Figure 22:
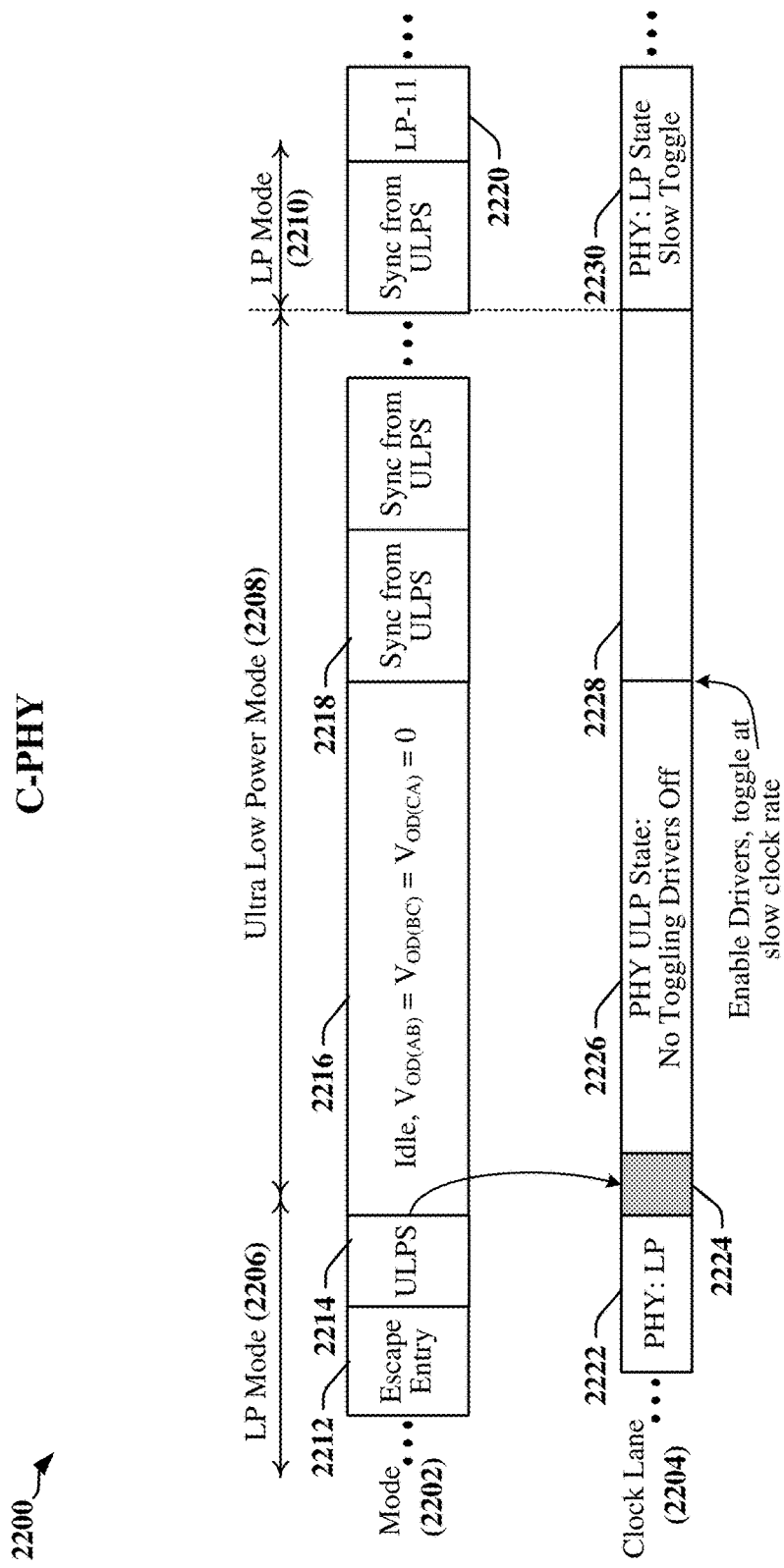
FIG. 22 illustrates an example of transitions to and from an ultralow power mode in a C-PHY interface adapted in accordance with certain aspects disclosed herein.

FIG. 21 illustrates an example of the transition to and from Ultra Low Power (ULP) Mode for D-PHY and FIG. 22 illustrates an example of the transition to and from Ultra Low Power (ULP) Mode for D-PHY.

Figure 23:
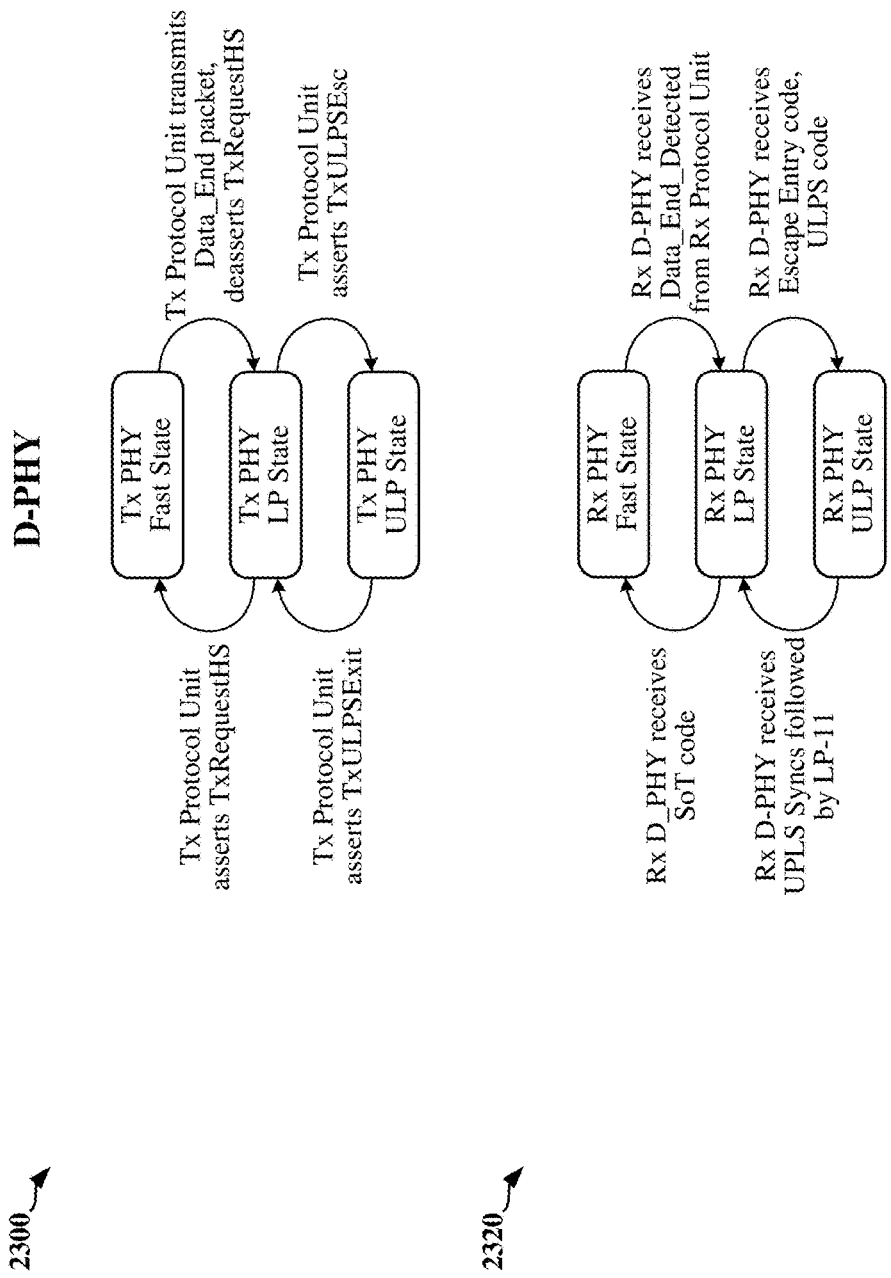
FIG. 23 is a state diagram that illustrates sequences of events in a D-PHY interface related to transitions between power states in a D-PHY interface adapted in accordance with certain aspects disclosed herein.
Figure 24:
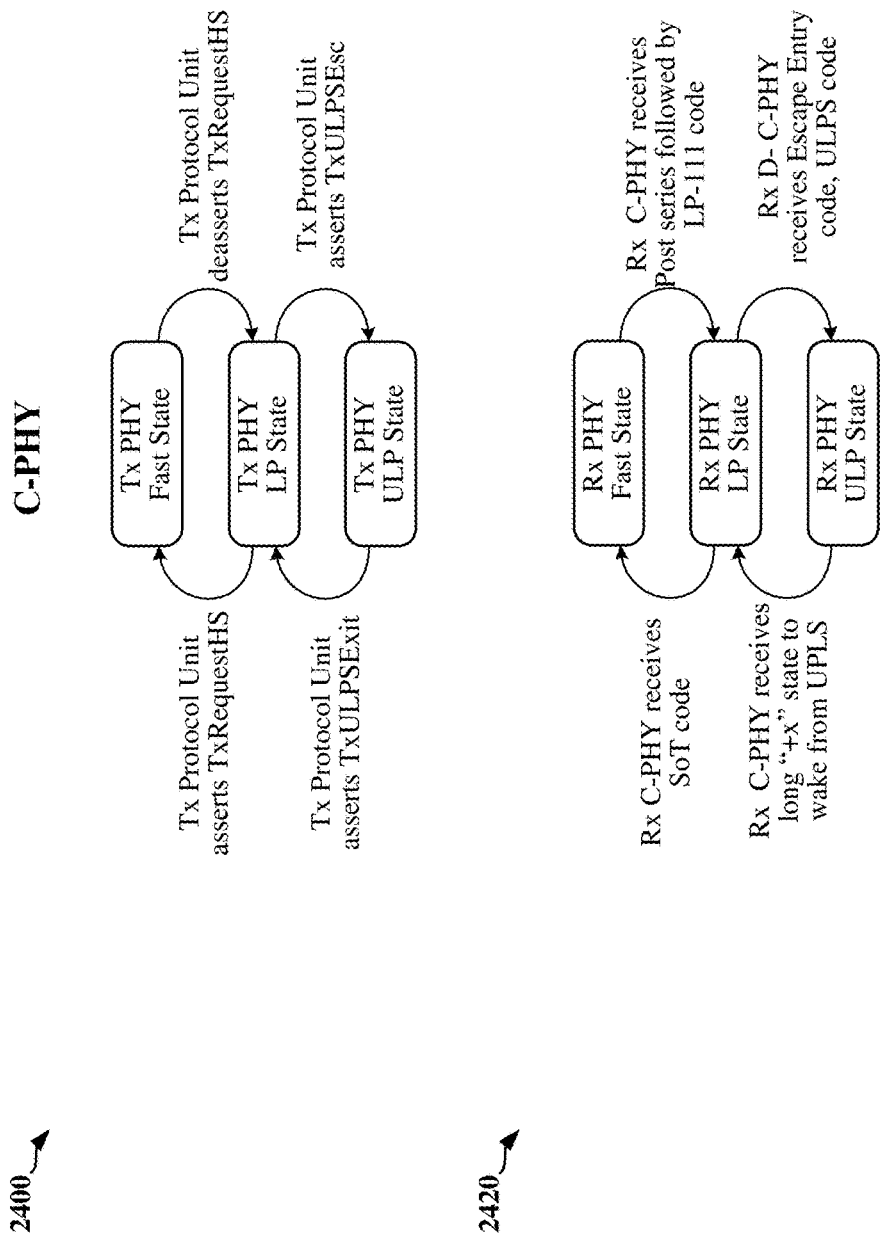
FIG. 24 is a state diagram that illustrates sequences of events in a C-PHY interface related to transitions between power states in a D-PHY interface adapted in accordance with certain aspects disclosed herein.

FIG. 23 is a state diagram that illustrates sequences of events in a D-PHY interface that cause transitions between the power states on the transmitter 2300 and receiver 2320. FIG. 24 is a state diagram that illustrates sequences of events in a D-PHY interface that cause transitions between the power states on the transmitter 2400 and receiver 2420.

Examples of Low-Power Event Codes

According to certain aspects disclosed herein, low-power event codes may be defined for use in C-PHY and D-PHY interfaces that are operable in an ALP mode of operation. In one example, the low-power event codes are multi-bit codes that are transmitted in a differential signaling mode as a replacement for high-voltage low-power (LP) states. In some instances, a single multi-bit code can be used to replace a sequence of the conventional LP states. In one example, the conventional D-PHY Escape Mode Entry (EME) sequence LP-11, LP-10, LP-00, LP-01, LP-00 can be replaced by transmission of a single multi-bit code. The EME sequence may include a specific Escape Mode Action command in a single multi-bit code. A first example of a set of codes relating to a D-PHY interface is listed in Table 1. A second example of a set of codes relating to a C-PHY interface is listed in Table 2.

TABLE 1

| Escape Code Action or States | Command Type | D-PHY Multi-Bit Code |
| --- | --- | --- |
| LP-00 (D-PHY) | Line State | 00000011 11110101 0000 |
| LP-01 (D-PHY) | Line State | 00000011 11110101 0001 |
| LP-10 (D-PHY) | Line State | 00000011 11110101 0010 |
| LP-11 (D-PHY), Also: EoT | Line State | 00000011 11110101 0011 |
| SoT | LP Sequence | 00000011 11110101 0100 |
| EME (Escape Mode Entry) | LP Sequence | 00000011 11110101 0101 |
| EME + LP Data Transmission | Mode Change | 00000011 11110101 0110 |
| EME + Ultralow Power State | Mode Change | 00000011 11110101 0111 |
| EME + Undefined-1 | Mode Change | 00000011 11110101 1000 |
| EME + Undefined-2 | Mode Change | 00000011 11110101 1001 |
| EME + Reset + Trigger (Remote Application) | Trigger | 00000011 11110101 1010 |
| EME + Entry Seq. for HS Test Mode Also: Undefined-3 | Trigger | 00000011 11110101 1011 |
| EME + Undefined-4 | Trigger | 00000011 11110101 1100 |
| EME + Undefined-5 | Trigger | 00000011 11110101 1101 |
| Sync from ULPS | Mode | 00000011 11110101 1110 |

TABLE 2

| Escape Code Action or States | Command Type | C-PHY Code |
| --- | --- | --- |
| LP-000 (C-PHY) | Line State | 0244440 |
| LP-001 (C-PHY) | Line State | 0244441 |
| LP-100 (C-PHY) | Line State | 0244442 |
| LP-111 (C-PHY), Also: EoT | Line State | 0244443 |
| SoT | LP Sequence | 1244440 |
| EME + LP Data Transmission | Mode Change | 1244441 |
| EME + Ultralow Power State | Mode Change | 1244442 |
| EME + Undefined-1 Trigger | Mode Change | 1244443 |
| EME + Undefined-2 Trigger | Mode Change | 2244440 |
| EME + Reset + Trigger (Remote Application) | Trigger | 2244441 |
| EME + Entry Seq. for HS Test Mode Also: Undefined-3 Trigger | Trigger | 2244442 |
| EME + Undefined-4 Trigger | Trigger | 2244443 |
| EME + Undefined-5 Trigger | Trigger | 3244440 |

TABLE 2-continued

| Escape Code Action or States | Command Type | C-PHY Code |
| --- | --- | --- |
| Sync from ULPS | Mode | 3244441 |
| LP Data Transfer, Lower Nibble | LP Data | $S_1 24444 S_0$ |
| LP Data Transfer, Upper Nibble | LP data | $S_3 24444 S_2$ |

According to certain aspects, the multi-bit codes may be selected for use in an interface adapted for ALP mode of operation when the codes exhibit beneficial autocorrelation and cross-correlation properties. Autocorrelation and/or cross-correlation properties may be considered beneficial when the structure or content of the bits in the codes prevent or avoid erroneous detection of an alias code of another multi-bit code, which may cause an inadvertent change in low-power state. Multi-bit codes may be selected when their autocorrelation and/or cross-correlation properties are such that the codes essentially frame themselves, and there is no requirement for supplemental framing to enable detection of the code words. While Table 1 provides an example set of codes for D-PHY interfaces, other code sets may be available and/or used. For example, multi-bit codes may also be created to represent 2-bit or 4-bit LP data sequences for LP data transmission.

The formation or appearance of an alias is illustrated in the example depicted in FIG. 25. The table 2500 illustrates an alternative set of multi-bit codes used to represent low-power event codes 2502, 2504, 2506, and 2508. A sequence of event codes 2510 transmitted on a D-PHY interface may be incorrectly received at a receiver, and the receiver may identify the alias of LP-10 2512 in the received signaling. By way of example, the codes for D-PHY interfaces illustrated in Table 1 are more robust, being less susceptible to producing erroneous aliases.

In a C-PHY interface, the code words may be selected and/or transmitted as sequences of unmapped symbols that provide the autocorrelation and cross-correlation properties and/or other properties described above in relation to Table 1. That is, code words may be selected for their autocorrelation and cross correlation properties, such that the code words are self-framing, and shifted versions of concatenated code words do not alias in manner that can be mistaken for another code word. Codes may have different lengths and, in the example of the C-PHY interface, a multi-bit code can be provided as a symbol sequence of any appropriate length. The symbol sequence need not be limited to 7 symbols, and symbols for transmission can be produced without using a mapper 302 (see FIG. 3). A C-PHY receiver may be adapted to interpret LP signaling without knowledge of the power state of the interface.

In one example, codes for a C-PHY interface may be selected from surplus sequences of symbols. The surplus sequences of symbols may be sequences of symbols that are available to the mapper but are unused because the data to be mapped encodes fewer values than the number of sequences of symbols available for transmission. In the example, of a C-PHY 3-Wire, 3-Phase encoder (see FIG. 3, for example), a 16-bit input data word 318 may be mapped to seven symbols 312. A Mapper 302 maps the 65,536 possible values of the input data word 318 to a corresponding number of the 78,215 possible permutations of sequences of phase and polarity for the three wires of the interface. Accordingly, 12,589 permutations of symbols may be considered to be surplus sequences of symbols because they are unused by conventional mappers.

Inserting Link Control Symbol Sequences

Figure 26:
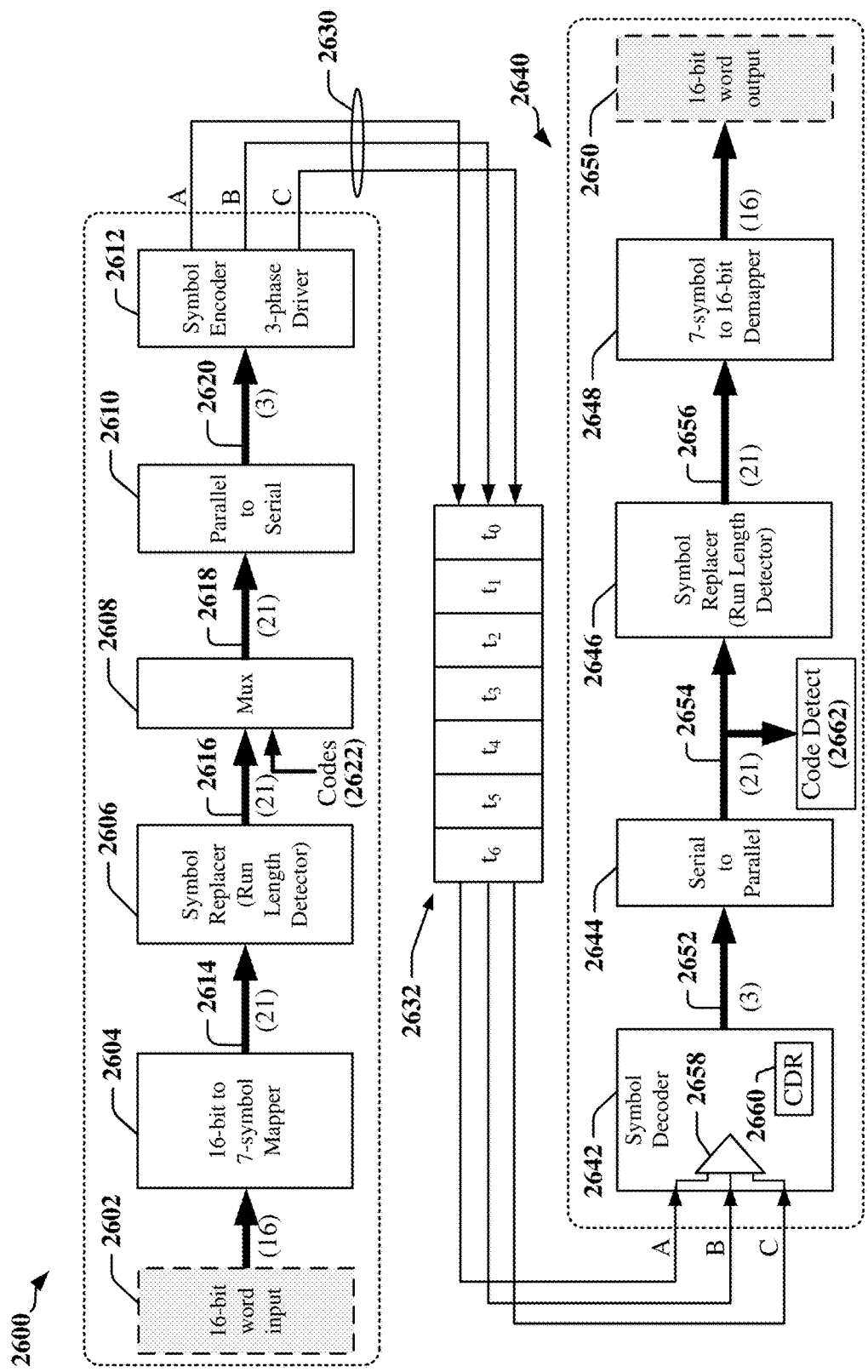
FIG. 26 illustrates an example of an end-to-end implementation of a C-PHY interface adapted in accordance with certain aspects disclosed herein.

FIG. 26 illustrates an example of an end-to-end implementation of a C-PHY interface adapted according to certain aspects disclosed herein. A transmitter 2600 and a receiver 2640 are coupled by a multi-wire data link 2630 and may be adapted to transmit a stream of symbols in which 7-symbol sequences that encode data may be multiplexed with control symbol sequences and other symbol sequences. The transmitter 2600 and a receiver 2640 may be further adapted to substitute certain 7-symbol sequences which may cause or be likely to cause a run-length condition on one or more of the wires in the multi-wire data link 2630.

In the transmitter 2600, a data source 2602 provides 16-bit words for transmission. The 16-bit words received from the data source 2602 may be provided as the input to a mapper 2604. The mapper 2604 converts each of the 16-bit words to seven symbols in a set of symbols 2614 to be transmitted sequentially over a 3-wire data link 2630. The set of symbols 2614 may be provided as a group of 21 bits organized as seven 3-bit symbols. A symbol replacer 2606 may be used to avoid signaling issues, such as run-length issues, which may arise when one or more wires remain in the same signaling state for an excessive number of successive symbols. In a C-PHY interface, conventional mapping and encoding can produce consecutive states on the trio of wires such that one of the wires remains in the same state for many consecutive symbols. When one of the three wires is held at a constant value for too long, certain undesirable effects may result, including increased inter-symbol interference (ISI). The number of consecutive states in which a wire has the same value (voltage or current flow) may be referred to as "run-length" and a run-length of N may describe a condition in which a wire remains in the same voltage or current state for N symbols. Prolonged run-lengths may affect the switching time as capacitances accumulate charge and/or as current builds in inductances. Increased switching times can lead to constraints on maximum symbol frequency because the time during which the wires of a C-PHY interface are stable and available for sampling is reduced.

The symbol replacer 2606 may ameliorate or prevent run-length issues. The set of symbols 2614 may be provided to the symbol replacer 2606 configured to limit run-length by selectively substituting certain sets of symbols 2614 received from the mapper 2604 with a replacement set of symbols. This symbol replacer provides a selectively modified group of bits 2616 to a multiplexer 2608 that may be operated to multiplex the selectively modified group of bits 2616 with bits corresponding to sequences of symbols used to manage control operation of the multi-wire data link 2630. The multiplexer 2608 may multiplex the selectively modified group of bits 2616 with symbols of sequences representative of synchronization, mode selection, and other codes 2622.

The multiplexer 2608 provides stream of symbols 2618, which are to be transmitted on the multi-wire data link 2630, to a parallel-to-serial converter 2610 that produces a timed-sequence of 3-bit symbols 2620 to a symbol encoder 2612. The symbol encoder 2612 defines the state of the three wires (labeled A, B and C) of the multi-wire data link 2630 in each of a sequence of symbol transmission intervals 2632.

In a C-PHY interface, up to 12,589 sequences of symbols may be unused by the mapper 2604 and these unused can be available to the symbol replacer 2606 for substitutions and insertions. The unused sequences of symbols are available because the mapper 2604 maps 65,536 possible values of the 16-bit data words to a corresponding number of the 78,215 possible permutations of sequences of phase and polarity for the three wires.

At the receiver 2640, a symbol decoder 2642 may include a set of differential receivers 2658 and a CDR 2660, which may cooperate to produce a receiver clock used to decode a sequence of seven raw 3-bit symbols 2652 from the signaling state and transitions in signaling state of the three wires of the multi-wire data link 2630 during the sequence of symbol transmission intervals 2632. The receiver 2640 may include a serial-to-parallel convertor 2644 that converts the sequence of seven raw 3-bit symbols 2652 to a set of bits 2654 representing the seven 3-bit symbols 2652. The set of bits 2654 may be provided to one or more code detection circuits 2662 that can identify symbols of sequences representative of synchronization, mode selection, and other codes.

A reverse symbol replacer 2646 may be adapted or configured to receive the set of bits 2654 and to produce a selectively modified set of bits 2656 after reversing symbol substitutions that may have been performed by the symbol replacer 2606 in the transmitter 2600. The reverse symbol replacer 2646 may be configured to identify certain sequences of symbols in the 12,589 sequences of symbols that are not used by the mapper 2604, and to perform a predefined substitution as needed. A demapper 2648 may convert each 7 symbol sequence (represented by the selectively modified set of bits 2656) to a 16-bit word, which may be provided as an output 2650 of the receiver 2640.

Each symbol detected by the receiver 2640 can be represented using a 3-bit raw symbol value, having one of five possible values: 000, 001, 010, 011 and 100. The value of the raw symbol value is defined by: {Same_Phase, delta_Phase, delta_Polarity}. Each of the three bits represents a change or no change from the previous wire state to the present wire state.

The symbol replacers 2606 and 2646 may be incorporated in the mapper 2604 and demapper 2648, respectively, and/or may be provided as distinct components. The symbol replacer 2606 in the transmitter 2600 may be employed to perform a variety of substitutions or insertions using surplus symbols.

Figure 27:
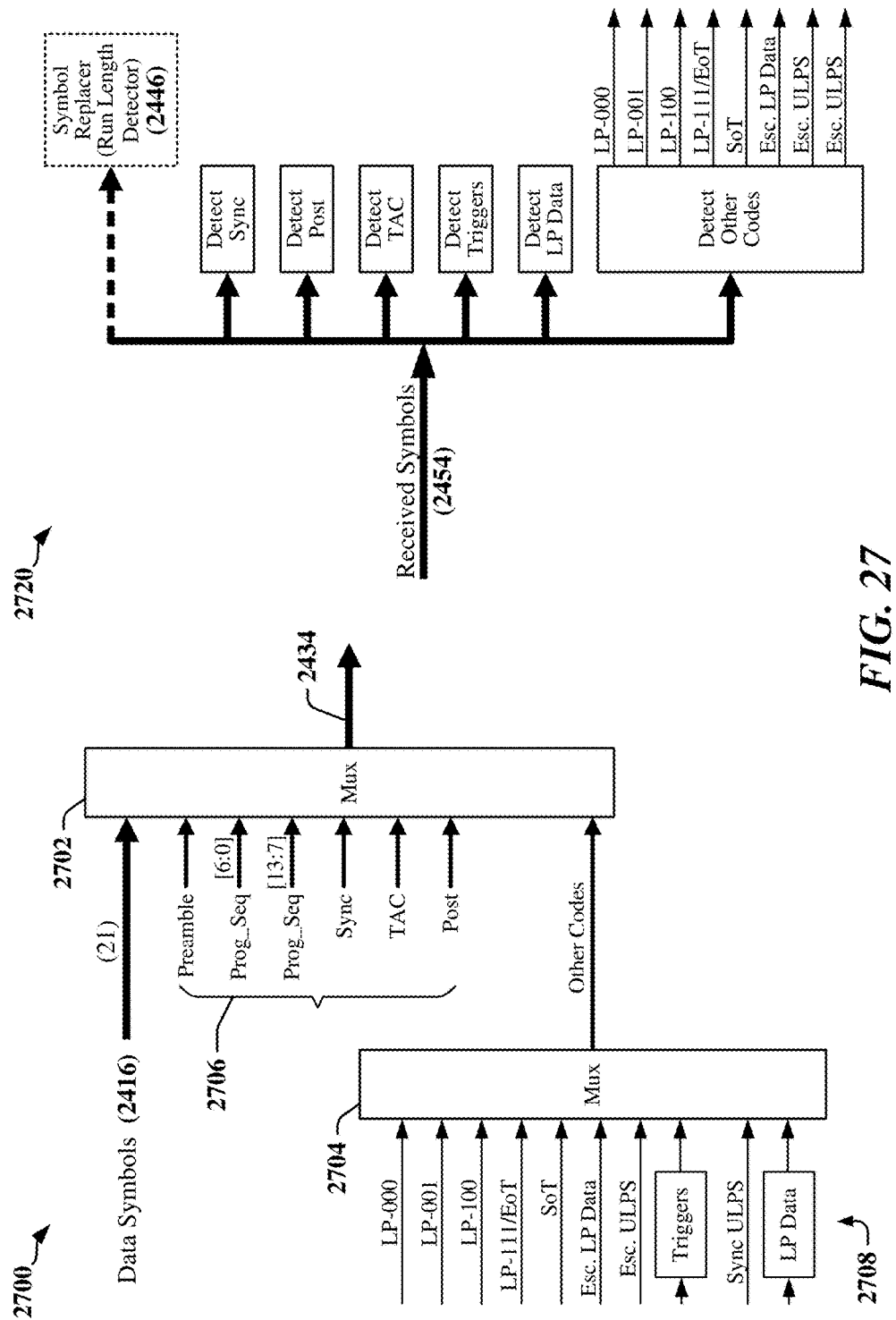
FIG. 27 illustrates an example of symbol sequence multiplexing adapted for symbol and/or symbol sequence insertion in accordance with certain aspects disclosed herein.

FIG. 27 illustrates an example of symbol sequence multiplexing in accordance with certain aspects disclosed herein. Multiplexing circuits 2700 may correspond to the multiplexer 2608 of FIG. 26, and may be implemented using one or more multiplexer circuits 2702, 2704. In one example, the multiplexer circuits 2702, 2704 may be configured to implement a hierarchical multiplexer. In another example, the multiplexer circuits 2702, 2704 may group inputs by function or in accordance with a transmission sequence. For example, a first set of code words 2706 may relate to controlling state of the C-PHY interface, a second set of code words 2708 may relate to communication mode control and transitions between modes.

Code detection circuits 2720 in a receiver may correspond to the code detection circuits 2662 of FIG. 26. The code detection circuits 2720 may include one or more comparison circuits used to detect certain reserved sequences of symbols. In some instances, the code detection circuits 2720 may be controlled by a state machine or other processor or controller to enable the receiver to handle control codes that have meaning and/or validity when the interface is in certain states, where the control codes that are invalid in other states and their detection may indicate a transmission or other error.

ALP ULPS Transitions in a C-PHY Interface

Figure 28:
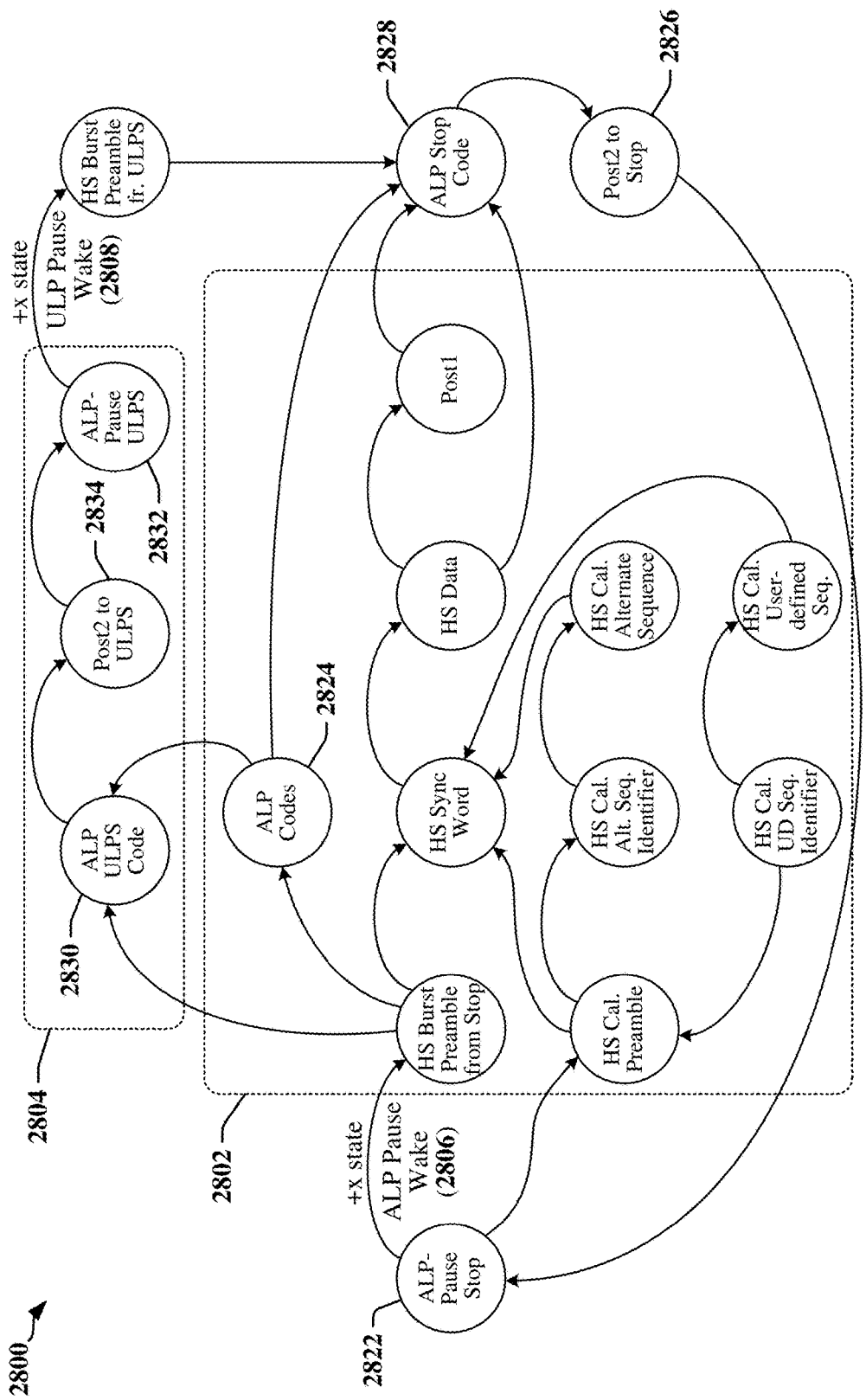
FIG. 28 illustrates an example of lane operation in a C-PHY interface that includes high-speed and advanced low-power modes of operation according to certain aspects disclosed herein.

FIG. 28 is a state diagram 2800 illustrating an example of lane operation in a C-PHY interface that includes high-speed mode 2802 and ALP Mode 2804. During normal operation in ALP Mode 2804, a lane of a C-PHY interface may be in ALP-Pause 2822, ALP-Pause_Wake 2806. High-Speed data transmission begins and ends with an ALP-Pause state 2822. The lane is in High-Speed mode 2802 during data bursts and during ALP signaling 2824. The sequence to enter High-Speed mode 2802 for data bursts or ALP signaling may include ALP-Pause Wake 2806 followed by a preamble consisting of all 1's or all 3's symbols. Code words can be sent after the preamble to define the specific purpose of the burst. Codes used for ALP signaling may initiate or perform identical functions as corresponding LLP Mode LP pulse sequences. The lane exits the High-Speed mode 2802 and returns to ALP-Pause Stop state 2822 after detection of a Post2 code 2826. The Post2 code 2826 may be transmitted after a Stop Code 2828 or the ULPS Code 2830. The ALP-Pause Stop state 2822 serves as a general standby state and may last for any period of time.

A C-PHY lane may be initially in the ALP-Pause Stop state 2822 or the ALP-Pause ULPS state 2832 where all three Lines of the Lane are driven to the same level (e.g., $V_A=V_B=V_C$). In operation, the ALP-Pause Stop state 2822 and the ALP-Pause ULPS state 2832 may be similar to the Legacy Low Power (LLP) Mode Stop and ULPS states, respectively. The transmitter may drive the +x state or one of the other high-speed states for an extended period of time to wake up the receiver. The transmitter then transmits a preamble. The preamble may comprise an all-3 symbol sequence in a data burst or an ALP command burst. The preamble may comprise an all-1 symbol sequence in a calibration burst. At the end of any burst the transmitter sends the Stop Code 2828 or the ULPS Code 2830. The Stop Code 2828 or the ULPS Code 2830 may inform the receiver that the link will shut down following the Post2 code 2826, 2834. The Stop Code 2828 may be followed by sequence that comprises the Post2 code 2826 to inform the receiver that the link will immediately return to the ALP-Pause Stop state 2822. The ULPS Code 2830 may be followed by the Post2 code 2834 to inform the receiver that the link will immediately return to the ALP-Pause ULPS state 2832.

A PHY protocol may provide the receiver a longer time to wake up from the ALP-Pause ULPS state 2832 than from the ALP-Pause Stop state 2822. This longer time to wake up can enable the receiver to have a lower power consumption in the ALP-Pause ULPS state 2832 compared to the ALP-Pause Stop state 2822.

FIG. 29 includes a first table 2900 that describes ALP transmitter states and a second table that relates certain ALP codes to corresponding LLP sequences.

In some implementations, trigger codes may provide functionalities that are provided by certain LLP Escape Mode pulse sequences. Commands to transmit the trigger codes are received from an upper layer transmit protocol unit. When the receiver receives any of the trigger codes it reports the identity of the trigger code to an upper layer receive protocol unit.

A Spacer Code may be transmitted at any time after a preamble and prior to transmission of the Stop Code 2828 or the ULPS Code 2830. The Spacer Code may perform no specific function in the receiver other than to provide a means for the transmitter to insert a delay between other codes or to be able to transmit a code instead of momentarily pausing the Lane timing.

The LPDT Start Code and LPDT Nibble Code together perform the same functions as certain corresponding LLP pulse sequences (e.g., Escape Mode Entry+LP Data Transfer Command followed by the LP Data). In one example, the transmitter transmits LP Data using a series of LPDT Nibble Codes.

Additional Descriptions Related to Processing Circuits

Figure 30:
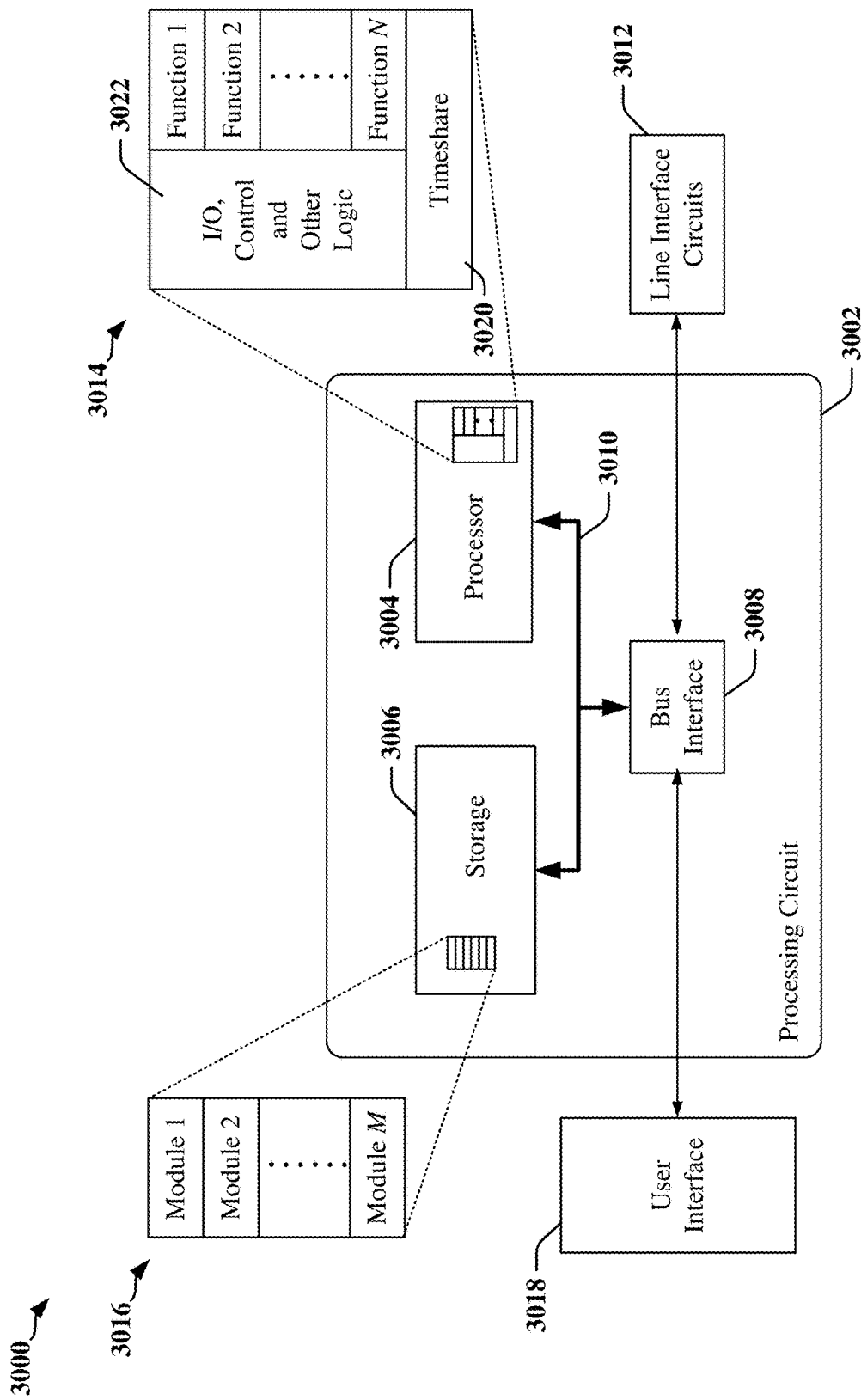
FIG. 30 is a diagram illustrating an example of an apparatus employing a processing circuit that may be adapted according to certain aspects disclosed herein.

FIG. 30 is a conceptual diagram illustrating a simplified example of a hardware implementation for an apparatus 3000 employing a processing circuit 3002 that may be configured to perform one or more functions disclosed herein. In accordance with various aspects of the disclosure, an element, or any portion of an element, or any combination of elements as disclosed herein may be implemented using the processing circuit 3002. The processing circuit 3002 may include one or more processors 3004 that are controlled by some combination of hardware and software modules. Examples of processors 3004 include microprocessors, microcontrollers, digital signal processors (DSPs), ASICs field programmable gate arrays (FPGAs), programmable logic devices (PLDs), state machines, sequencers, gated logic, discrete hardware circuits, and other suitable hardware configured to perform the various functionality described throughout this disclosure. The one or more processors 3004 may include specialized processors that perform specific functions, and that may be configured, augmented or controlled by one of the software modules 3016. The one or more processors 3004 may be configured through a combination of software modules 3016 loaded during initialization, and further configured by loading or unloading one or more software modules 3016 during operation.

In the illustrated example, the processing circuit 3002 may be implemented with a bus architecture, represented generally by the bus 3010. The bus 3010 may include any number of interconnecting buses and bridges depending on the specific application of the processing circuit 3002 and the overall design constraints. The bus 3010 links together various circuits including the one or more processors 3004, and storage 3006. Storage 3006 may include memory devices and mass storage devices, and may be referred to herein as computer-readable media and/or processor-readable media. The bus 3010 may also link various other circuits such as timing sources, timers, peripherals, voltage regulators, and power management circuits. A bus interface 3008 may provide an interface between the bus 3010 and one or more line interface circuits 3012. A line interface circuit 3012 may be provided for each networking technology supported by the processing circuit. In some instances, multiple networking technologies may share some or all of the circuitry or processing modules found in a line interface circuit 3012. Each line interface circuit 3012 provides a means for communicating with various other apparatus over a transmission medium. Depending upon the nature of the apparatus 3000, a user interface 3018 (e.g., keypad, display, speaker, microphone, joystick) may also be provided, and may be communicatively coupled to the bus 3010 directly or through the bus interface 3008.

A processor 3004 may be responsible for managing the bus 3010 and for general processing that may include the execution of software stored in a computer-readable medium that may include the storage 3006. In this respect, the processing circuit 3002, including the processor 3004, may be used to implement any of the methods, functions and techniques disclosed herein. The storage 3006 may be used for storing data that is manipulated by the processor 3004 when executing software, and the software may be configured to implement any one of the methods disclosed herein.

One or more processors 3004 in the processing circuit 3002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 3006 or in an external computer readable medium. The external computer-readable medium and/or storage 3006 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 3006 may also include, by way of example, a carrier wave, a transmission line, and any other suitable medium for transmitting software and/or instructions that may be accessed and read by a computer. Computer-readable medium and/or the storage 3006 may reside in the processing circuit 3002, in the processor 3004, external to the processing circuit 3002, or be distributed across multiple entities including the processing circuit 3002. The computer-readable medium and/or storage 3006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 3006 may maintain software maintained and/or organized in loadable code segments, modules, applications, programs, etc., which may be referred to herein as software modules 3016. Each of the software modules 3016 may include instructions and data that, when installed or loaded on the processing circuit 3002 and executed by the one or more processors 3004, contribute to a run-time image 3014 that controls the operation of the one or more processors 3004. When executed, certain instructions may cause the processing circuit 3002 to perform functions in accordance with certain methods, algorithms and processes described herein.

Some of the software modules 3016 may be loaded during initialization of the processing circuit 3002, and these software modules 3016 may configure the processing circuit 3002 to enable performance of the various functions disclosed herein. For example, some software modules 3016 may configure internal devices and/or logic circuits 3022 of the processor 3004, and may manage access to external devices such as the line interface circuit 3012, the bus interface 3008, the user interface 3018, timers, mathematical coprocessors, and so on. The software modules 3016 may include a control program and/or an operating system that interacts with interrupt handlers and device drivers, and that controls access to various resources provided by the processing circuit 3002. The resources may include memory, processing time, access to the line interface circuit 3012, the user interface 3018, and so on.

One or more processors 3004 of the processing circuit 3002 may be multifunctional, whereby some of the software modules 3016 are loaded and configured to perform different functions or different instances of the same function. The one or more processors 3004 may additionally be adapted to manage background tasks initiated in response to inputs from the user interface 3018, the line interface circuit 3012, and device drivers, for example. To support the performance of multiple functions, the one or more processors 3004 may be configured to provide a multitasking environment, whereby each of a plurality of functions is implemented as a set of tasks serviced by the one or more processors 3004 as needed or desired. In one example, the multitasking environment may be implemented using a timesharing program 3020 that passes control of a processor 3004 between different tasks, whereby each task returns control of the one or more processors 3004 to the timesharing program 3020 upon completion of any outstanding operations and/or in response to an input such as an interrupt. When a task has control of the one or more processors 3004, the processing circuit is effectively specialized for the purposes addressed by the function associated with the controlling task. The timesharing program 3020 may include an operating system, a main loop that transfers control on a round-robin basis, a function that allocates control of the one or more processors 3004 in accordance with a prioritization of the functions, and/or an interrupt driven main loop that responds to external events by providing control of the one or more processors 3004 to a handling function.

Figure 31:
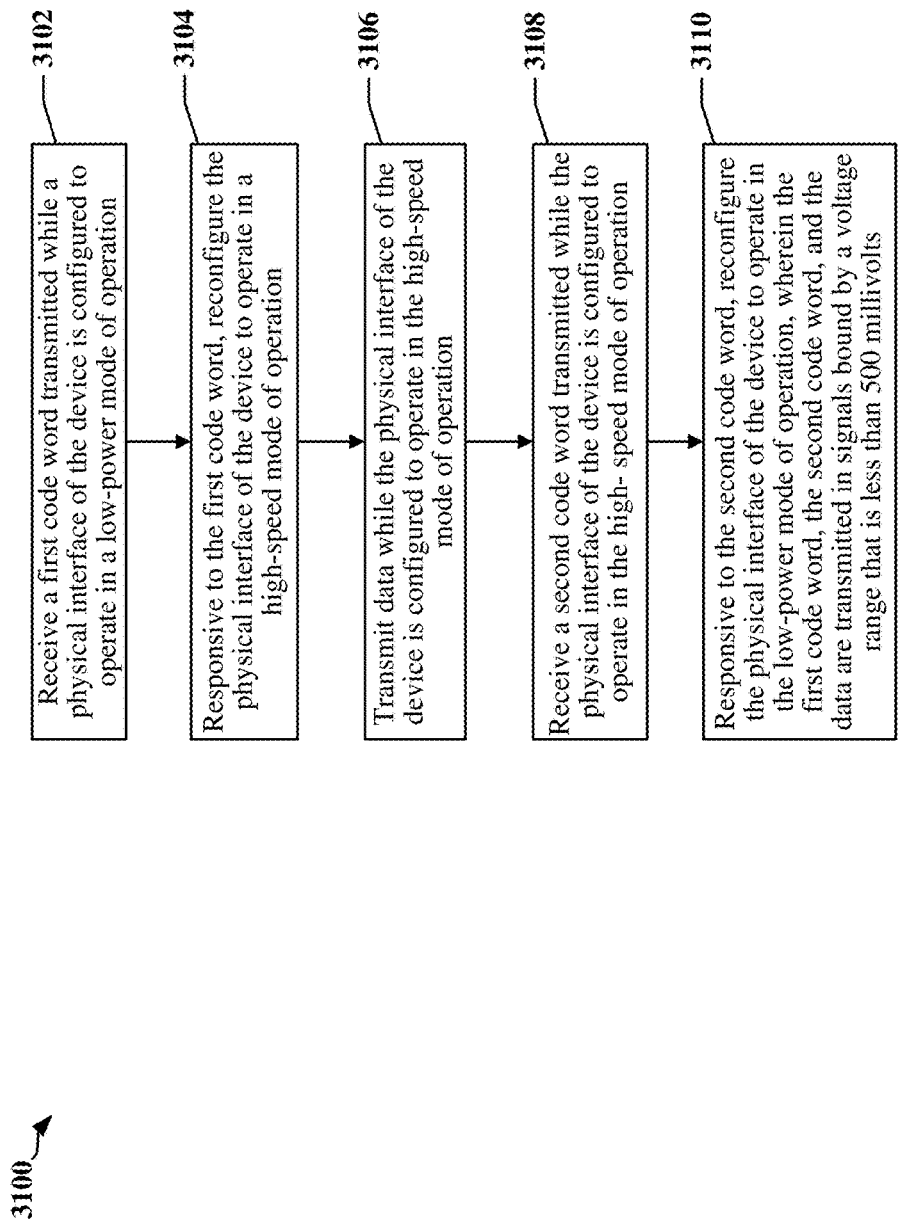
FIG. 31 is a flow chart of a data transfer method operational on one of two devices in an apparatus according to certain aspects disclosed herein.

FIG. 31 is a flow chart 3100 of a method operational a device configured for multiple modes of data communication.

At block 3102, the device may receive a first code word transmitted while a physical interface of the device is configured to operate in a low-power mode of operation. The physical interface may be a D-PHY interface. The physical interface may be a C-PHY interface.

At block 3104, in response to the first code word, the device may reconfigure the physical interface to operate in a high-speed mode of operation.

At block 3106, the device may transmit data while the physical interface is configured to operate in the high-speed mode of operation.

At block 3108, the device may receive a second code word transmitted while the physical interface is configured to operate in the high-speed mode of operation.

At block 3110, in response to the second code word, the device may reconfigure the physical interface to operate in the low-power mode of operation.

In some instances, the first code word, the second code word, and the data are transmitted in signals bound by a common voltage range. In one example, the common voltage range may be less than 600 millivolts. The voltage range may be defined by MIPI Alliance specifications. In one example, the voltage range may be no more than 250 millivolts. In another example, the voltage range may be no more than 200 millivolts.

According to certain aspects, the first code word and the second code word are self-framing. The first code word may be transmitted in a concatenated sequence of code words. The concatenated sequence of code words may include a plurality of multi-bit words. Each multi-bit word may include bits configured such that shifted versions of the concatenated sequence of code words does produce an alias of another code word. The concatenated sequence of code words may include a plurality of multi-bit words selected to have autocorrelation and cross-correlation properties that avoid occurrence of aliases detected in shifted versions of the concatenated sequence of code words.

In one example, the second code word is included in a Data End Packet. The Data End Packet may be detected using a protocol unit. The protocol unit may provide a detection signal to the physical interface in response to detection of the Data End Packet. Reconfiguring the physical interface of the device to operate in the low-power mode of operation may include reconfiguring the physical interface in response to the detection signal.

According to certain aspects, the device may receive a third code word transmitted while the physical interface of the device is configured to operate in the low-power mode of operation. In some instances, the third code may be received while physical interface of the device is configured to operate in the high-speed mode of operation. The device may reconfigure the physical interface of the device to operate in an ultra-low-power (ULP) mode of operation in response to the third code word. The device may disable or turn off a receiving device or circuit while the physical interface of the device is configured to operate in the ULP mode of operation.

The device may detect a waking signaling state of the multi-wire data link while the physical interface of the device is configured to operate in the ULP mode of operation. The waking signaling state may correspond to a symbol transmitted on the multi-wire data link. The waking signaling state may persist for at least 50 microseconds. In some instances, the waking signaling state persists for 100 ms or longer. In response to a detected waking signaling state, the device may reconfigure the physical interface of the device to operate in the low-power mode of operation. The waking signaling state of the multi-wire data link may be detected by comparing voltage levels on two wires of the multi-wire data link using a low-power differential receiver.

Figure 32:
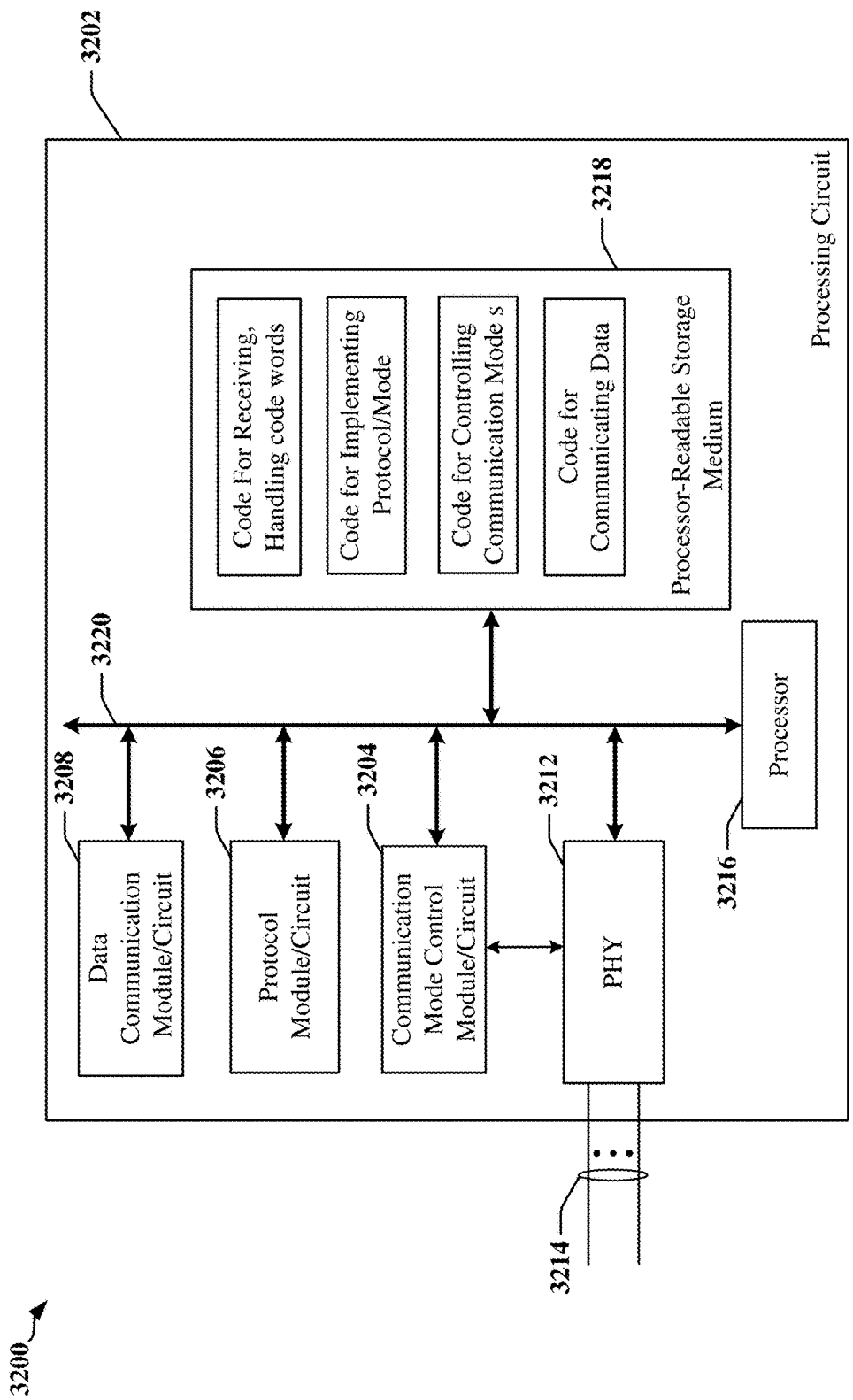
FIG. 32 is a diagram illustrating an example of a hardware implementation for an apparatus employing a processing employing a processing circuit adapted according to certain aspects disclosed herein.

FIG. 32 is a diagram illustrating a simplified example of a hardware implementation for an apparatus 3200 employing a processing circuit 3202. The processing circuit typically has a processor 3216 that may include one or more of a microprocessor, microcontroller, digital signal processor, a sequencer and a state machine. The processing circuit 3202 may be implemented with a bus architecture, represented generally by the bus 3220. The bus 3220 may include any number of interconnecting buses and bridges depending on the specific application of the processing circuit 3202 and the overall design constraints. The bus 3220 links together various circuits including one or more processors and/or hardware modules, represented by the processor 3216, the modules or circuits 3204, 3206, and 3208, a PHY 3212 configurable to communicate over connectors or wires of a multi-wire communication link 3214 and the computer-readable storage medium 3218. The bus 3220 may also link various other circuits such as timing sources, peripherals, voltage regulators, and power management circuits.

The processor 3216 is responsible for general processing, including the execution of software stored on the computer-readable storage medium 3218. The software, when executed by the processor 3216, causes the processing circuit 3202 to perform the various functions described supra for any particular apparatus. The computer-readable storage medium 3218 may also be used for storing data that is manipulated by the processor 3216 when executing software, including data decoded from symbols transmitted over the communication link 3214, which may be configured as data lanes and clock lanes. The processing circuit 3202 further includes at least one of the modules 3204, 3206, and 3208. The modules 3204, 3206, and 3208 may be software modules running in the processor 3216, resident/stored in the computer-readable storage medium 3218, one or more hardware modules coupled to the processor 3216, or some combination thereof. The 3204, 3206, and/or 3208 may include microcontroller instructions, state machine configuration parameters, or some combination thereof.

In one configuration, the apparatus 3200 for data communication includes modules and/or circuits 3208, 3212 configured to receive code words from a multi-wire communication link 3214, where the code words are configured to initiate a change in communication mode of the PHY 3212. The apparatus may include modules and/or circuits 3204 configured to reconfigure the PHY 3212 to operate in a high-speed mode of operation in response to one of the code words and to reconfigure the physical interface to operate in a low-power mode of operation in response to another of the code words. The apparatus may include modules and/or circuits 3208, 3212 configured to transmit data while the PHY 3212 is configured to operate in the high-speed mode of operation. The first code word, the second code word, and the data may be transmitted in signals bound by a common voltage range. In one example, the voltage range is less than 600 millivolts.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method performed in a device configured for multiple modes of data communication, comprising:
receiving a first code word transmitted while a physical interface of the device is configured to operate in a low-power mode of operation;
responsive to the first code word, reconfiguring the physical interface of the device to operate in a high-speed mode of operation;
receiving data from a multi-wire data link while the physical interface of the device is configured to operate in the high-speed mode of operation;
receiving a second code word transmitted while the physical interface of the device is configured to operate in the high-speed mode of operation; and
responsive to the second code word, reconfiguring the physical interface of the device to operate in the low-power mode of operation,
wherein the first code word, the second code word, and the data are transmitted in signals bound by a voltage range that is less than 600 millivolts.

2. The method of claim 1, wherein the physical interface is a D-PHY interface defined by Mobile Industry Processor Interface (MIPI) Alliance specifications.

3. The method of claim 1, further comprising:
receiving a third code word transmitted while the physical interface of the device is configured to operate in the low-power mode of operation;
responsive to the third code word, reconfiguring the physical interface of the device to operate in an ultra-low-power (ULP) mode of operation;
disabling or turning off a receiving device or circuit while the physical interface of the device is configured to operate in the ULP mode of operation;
detecting a waking signaling state of the multi-wire data link while the physical interface of the device is configured to operate in the ULP mode of operation; and
responsive to a detected waking signaling state, reconfiguring the physical interface of the device to operate in the low-power mode of operation.

4. The method of claim 3, wherein detecting the waking signaling state of the multi-wire data link comprises:
comparing voltage levels on two wires of the multi-wire data link using a low-power differential receiver.

5. The method of claim 1, wherein the physical interface is a C-PHY interface defined by MIPI Alliance specifications, and wherein the voltage range is defined by MIPI Alliance specifications to be no more than 250 millivolts.

6. The method of claim 1, wherein the first code word and the second code word are self-framing.

7. The method of claim 1, wherein the first code word is transmitted in a concatenated sequence of code words.

8. The method of claim 7, wherein the concatenated sequence of code words includes a plurality of multi-bit words, wherein each multi-bit word includes bits configured such that shifted versions of the concatenated sequence of code words does produce an alias of another code word.

9. The method of claim 7, wherein the concatenated sequence of code words includes a plurality of multi-bit words selected to have autocorrelation and cross-correlation properties that avoid occurrence of aliases detected in shifted versions of the concatenated sequence of code words.

10. The method of claim 1, wherein the second code word is included in a Data End Packet, further comprising:
detecting the Data End Packet in a protocol unit; and
providing, by the protocol unit, a detection signal to the physical interface in response to detection of the Data End Packet.

11. The method of claim 10, wherein reconfiguring the physical interface of the device to operate in the low-power mode of operation includes:
reconfiguring the physical interface in response to the detection signal.

12. An apparatus comprising:
a physical interface configurable for multiple communication modes; and
a processor configured to:
receive a first code word transmitted while the physical interface is configured to operate in a low-power mode of operation;
responsive to the first code word, reconfigure the physical interface to operate in a high-speed mode of operation;
transmit data while the physical interface is configured to operate in the high-speed mode of operation;
receive a second code word transmitted while the physical interface is configured to operate in the high-speed mode of operation; and
responsive to the second code word, reconfigure the physical interface to operate in the low-power mode of operation,
wherein the first code word, the second code word, and the data are transmitted in signals bound by a voltage range that is less than 600 millivolts.

13. The apparatus of claim 12, wherein the physical interface is a D-PHY interface defined by Mobile Industry Processor Interface (MIPI) Alliance specifications.

14. The apparatus of claim 12, wherein the physical interface is a C-PHY interface defined by MIPI Alliance specifications.

15. The apparatus of claim 12, further comprising:
a low-power differential receiver adapted to compare voltage levels on two wires of a multi-wire data link when the physical interface is operated in the low-power mode of operation,
wherein the first code word is received after the low-power differential receiver detects a difference in voltage levels on the two wires of the multi-wire data link.

16. The apparatus of claim 12, wherein the voltage range is defined by MIPI Alliance specifications to be no more than 250 millivolts.

17. The apparatus of claim 12, wherein the first code word and the second code word are self-framing.

18. The apparatus of claim 12, wherein the first code word is transmitted in a concatenated sequence of code words.

19. The apparatus of claim 18, wherein the concatenated sequence of code words includes a plurality of multi-bit words, wherein each multi-bit word includes bits configured such that shifted versions of the concatenated sequence of code words does produce an alias of another code word.

20. The apparatus of claim 18, wherein the concatenated sequence of code words includes a plurality of multi-bit words selected to have autocorrelation and cross-correlation properties that avoid occurrence of aliases detected in shifted versions of the concatenated sequence of code words.

21. A non-transitory processor readable storage medium comprising code for:

receiving a first code word transmitted while a physical interface is configured to operate in a low-power mode of operation;

responsive to the first code word, reconfiguring the physical interface to operate in a high-speed mode of operation;

transmitting data while the physical interface is configured to operate in the high-speed mode of operation;

receiving a second code word transmitted while the physical interface is configured to operate in the high-speed mode of operation; and responsive to the second code word, reconfiguring the physical interface to operate in the low-power mode of operation, wherein the first code word, the second code word, and the data are transmitted in signals bound by a voltage range that is less than 600 millivolts.

22. The storage medium of claim 21, wherein the physical interface is a D-PHY interface defined by Mobile Industry Processor Interface (MIPI) Alliance specifications.

23. The storage medium of claim 21, wherein the physical interface is a C-PHY interface defined by MIPI Alliance specifications.

24. The storage medium of claim 21, wherein the voltage range is defined by MIPI Alliance specifications to be no more than 250 millivolts.

25. The storage medium of claim 21, wherein the voltage range is defined by MIPI Alliance specifications to be no more than 200 millivolts.

26. The storage medium of claim 21, wherein the first code word and the second code word are self-framing.

27. The storage medium of claim 21, wherein the first code word is transmitted in a concatenated sequence of code words.

28. The storage medium of claim 27, wherein the concatenated sequence of code words includes a plurality of multi-bit words, wherein each multi-bit word includes bits configured such that shifted versions of the concatenated sequence of code words does produce an alias of another code word.

29. The storage medium of claim 27, wherein the concatenated sequence of code words includes a plurality of multi-bit words selected to have autocorrelation and cross-correlation properties that avoid occurrence of aliases detected in shifted versions of the concatenated sequence of code words.

30. An apparatus, comprising:
means for receiving code words from a multi-wire communication link, the means for receiving code words including a physical interface, wherein the code words are configured to initiate a change in communication mode of the physical interface;

means for reconfiguring the physical interface to operate in a high-speed mode of operation in response to one of the code words and for reconfiguring the physical interface to operate in a low-power mode of operation in response to another of the code words; and means for transmitting data while the physical interface is configured to operate in the high-speed mode of operation, wherein the code words and the data are transmitted in signals bound by a voltage range that is less than 600 millivolts.

* * * * *